United States Patent
Ricci

(10) Patent No.: US 10,632,852 B2
(45) Date of Patent: Apr. 28, 2020

(54) ELECTRIC VEHICLE OPTICAL CHARGING SYSTEM AND METHOD OF USE

(71) Applicant: NIO USA, Inc., San Jose, CA (US)

(72) Inventor: Christopher P. Ricci, Saratoga, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/145,416

(22) Filed: May 3, 2016

(65) Prior Publication Data

US 2017/0136890 A1    May 18, 2017

Related U.S. Application Data

(60) Provisional application No. 62/255,214, filed on Nov. 13, 2015, provisional application No. 62/259,536, (Continued)

(51) Int. Cl.
*B60L 53/12* (2019.01)
*B60L 11/18* (2006.01)
(Continued)

(52) U.S. Cl.
CPC .......... *B60L 11/182* (2013.01); *B60L 3/0015* (2013.01); *B60L 3/0023* (2013.01); *B60L 3/0092* (2013.01);
(Continued)

(58) Field of Classification Search
CPC B60L 11/182; B60L 11/1825; B60L 11/1827; B60L 11/1829; B60L 11/1833;
(Continued)

(56) References Cited

U.S. PATENT DOCUMENTS 3,955,657 A   5/1976 Bossi
RE29,994 E   5/1979 Bossi
(Continued)

FOREIGN PATENT DOCUMENTS

CN   102025184   4/2011
CN   203301194   11/2013
(Continued)

OTHER PUBLICATIONS

U.S. Appl. No. 14/954,436, filed Nov. 30, 2015, Ricci.
(Continued)

*Primary Examiner* — Richard Isla
*Assistant Examiner* — Michael N Dibenedetto
(74) *Attorney, Agent, or Firm* — Sheridan Ross P.C.

(57) ABSTRACT

Techniques for electric vehicle systems, and in particular to a vehicle optical charging system and method of use. In one embodiment, a system for vehicle optical charging comprises: an optical charging station configured to transmit an optical signal, the optical charging station comprising a directive element configured to direct the transmitted optical signal; a receiving vehicle comprising an electrical storage unit and a receiver configured to receive the transmitted optical signal, the receiver in electrical communication with the electrical storage unit; wherein the received optical signal enables charging of the electrical storage unit.

20 Claims, 27 Drawing Sheets

Related U.S. Application Data filed on Nov. 24, 2015, provisional application No. 62/266,452, filed on Dec. 11, 2015, provisional application No. 62/269,764, filed on Dec. 18, 2015, provisional application No. 62/300,606, filed on Feb. 26, 2016, provisional application No. 62/310,387, filed on Mar. 18, 2016.

(51) Int. Cl.

| | |
|---|---|
| *H04B 10/80* | (2013.01) |
| *B60L 3/00* | (2019.01) |
| *B60L 5/18* | (2006.01) |
| *H02J 50/30* | (2016.01) |
| *H02J 7/02* | (2016.01) |
| *B60L 53/38* | (2019.01) |
| *B60L 53/14* | (2019.01) |
| *B60L 53/36* | (2019.01) |
| *B60L 53/30* | (2019.01) |
| *B60L 53/35* | (2019.01) |
| *H02J 7/35* | (2006.01) |
| *B60L 5/06* | (2006.01) |
| *B60L 5/08* | (2006.01) |
| *B60L 5/16* | (2006.01) |
| *G06Q 10/06* | (2012.01) |
| *G06Q 50/06* | (2012.01) |
| *G07C 5/00* | (2006.01) |
| *G07F 15/00* | (2006.01) |
| *B60L 5/00* | (2006.01) |
| *G07B 15/02* | (2011.01) |
| *G08G 1/00* | (2006.01) |

(52) U.S. Cl.
CPC .............. *B60L 5/005* (2013.01); *B60L 5/06* (2013.01); *B60L 5/08* (2013.01); *B60L 5/16* (2013.01); *B60L 5/18* (2013.01); *B60L 53/12* (2019.02); *B60L 53/14* (2019.02); *B60L 53/32* (2019.02); *B60L 53/35* (2019.02); *B60L 53/36* (2019.02); *B60L 53/38* (2019.02); *G06Q 10/06313* (2013.01); *G06Q 50/06* (2013.01); *G07C 5/008* (2013.01); *G07F 15/005* (2013.01); *H02J 7/025* (2013.01); *H02J 7/35* (2013.01); *H02J 50/30* (2016.02); *H04B 10/806* (2013.01); *H04B 10/807* (2013.01); *B60L 2250/10* (2013.01); *B60L 2250/16* (2013.01); *G07B 15/02* (2013.01); *G08G 1/20* (2013.01); *Y02T 10/7005* (2013.01); *Y02T 10/7072* (2013.01); *Y02T 10/7094* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01)

(58) Field of Classification Search
CPC .. B60L 11/1837; B60L 3/0015; B60L 3/0023; B60L 3/0092; B60L 5/005; B60L 5/06; B60L 5/08; B60L 5/16; B60L 5/18; H02J 50/30; H02J 7/025; H04B 10/806–808
USPC ........................................................ 320/108
See application file for complete search history.

(56) References Cited

U.S. PATENT DOCUMENTS

| | | |
|---|---|---|
| 4,331,225 A | 5/1982 | Bolger |
| 4,650,018 A | 3/1987 | Silverman, Sr. |
| 5,283,513 A | 2/1994 | Fujita et al. |
| 5,311,973 A | 5/1994 | Tseng et al. |
| 5,431,264 A | 7/1995 | Tseng et al. |
| 5,461,298 A | 10/1995 | Lara et al. |
| 5,563,491 A | 10/1996 | Tseng |
| 5,654,621 A | 8/1997 | Seelig |
| 5,696,367 A | 12/1997 | Keith |
| 5,821,728 A | 10/1998 | Schwind |
| 5,821,731 A | 10/1998 | Kuki et al. |
| 5,847,537 A | 12/1998 | Parmley, Sr. |
| 6,014,597 A | 1/2000 | Kochanneck |
| 6,291,901 B1 | 9/2001 | Cefo |
| 6,421,600 B1 | 7/2002 | Ross |
| 6,786,051 B2 | 9/2004 | Kristich et al. |
| 6,792,259 B1 * | 9/2004 | Parise ................ B01F 5/0614 |
| | | 455/343.1 |
| 6,877,581 B2 | 4/2005 | Badr et al. |
| 6,879,889 B2 | 4/2005 | Ross |
| 7,602,143 B2 | 10/2009 | Capizzo |
| 7,619,319 B1 | 11/2009 | Hunter |
| 7,714,536 B1 | 5/2010 | Silberg et al. |
| 7,729,803 B2 | 6/2010 | Lim et al. |
| 7,880,337 B2 | 2/2011 | Farkas |
| 8,030,888 B2 | 10/2011 | Pandya et al. |
| 8,164,301 B2 | 4/2012 | Uchida |
| 8,169,186 B1 | 5/2012 | Haddad et al. |
| 8,324,858 B2 | 12/2012 | Hill et al. |
| 8,386,103 B2 | 2/2013 | Tran |
| 8,536,831 B2 | 9/2013 | Kanno |
| 8,544,622 B2 | 10/2013 | Vollenwyder et al. |
| 8,552,685 B2 | 10/2013 | Kanno |
| 8,575,895 B2 | 11/2013 | Garrastacho et al. |
| D706,212 S | 6/2014 | Zwierstra et al. |
| 8,760,115 B2 | 6/2014 | Kinser et al. |
| 8,768,533 B2 | 7/2014 | Ichikawa |
| 8,796,990 B2 | 8/2014 | Paparo et al. |
| 8,841,785 B2 | 9/2014 | Theuss et al. |
| 8,841,881 B2 | 9/2014 | Failing |
| 8,853,999 B2 | 10/2014 | Haddad et al. |
| 8,890,472 B2 | 11/2014 | Mashinsky |
| 8,963,481 B2 | 2/2015 | Prosser et al. |
| 8,970,060 B2 | 3/2015 | Ichikawa et al. |
| 9,007,020 B2 | 4/2015 | Prosser et al. |
| 9,018,904 B2 | 4/2015 | Seyerle et al. |
| 9,027,723 B2 | 5/2015 | Niizuma |
| 9,056,555 B1 | 6/2015 | Zhou |
| 9,067,497 B2 | 6/2015 | Ichikawa et al. |
| 9,090,315 B1 * | 7/2015 | Stone ................ G02B 6/3604 |
| D736,716 S | 8/2015 | Hough et al. |
| 9,114,719 B1 | 8/2015 | Failing |
| 9,120,506 B2 | 9/2015 | Isakiewitsch et al. |
| 9,123,035 B2 | 9/2015 | Penilla et al. |
| 9,124,124 B2 | 9/2015 | Van Wiemeersch et al. |
| 9,129,272 B2 | 9/2015 | Penilla et al. |
| 9,132,739 B2 | 9/2015 | Niizuma |
| 9,142,967 B2 | 9/2015 | Tomlinson |
| 9,177,305 B2 | 11/2015 | Penilla et al. |
| 9,177,306 B2 | 11/2015 | Penilla et al. |
| 9,193,277 B1 | 11/2015 | Penilla et al. |
| 9,260,029 B2 | 2/2016 | Niizuma |
| 9,272,631 B2 | 3/2016 | Bendicks |
| 9,335,179 B2 | 5/2016 | Penilla et al. |
| 9,348,381 B2 | 5/2016 | Khoo et al. |
| 9,393,878 B1 | 7/2016 | Failing |
| 9,493,085 B2 | 11/2016 | Van Wiemeersch et al. |
| 9,550,428 B1 | 1/2017 | Ertel |
| 9,552,920 B2 | 1/2017 | Bhat et al. |
| 9,592,742 B1 | 3/2017 | Sosinov et al. |
| 9,597,973 B2 | 3/2017 | Penilla et al. |
| 9,630,516 B2 | 4/2017 | Enomoto |
| 9,643,505 B2 | 5/2017 | Ichikawa et al. |
| 9,656,770 B2 | 5/2017 | Ikegami et al. |
| 9,669,719 B1 | 6/2017 | Gerber et al. |
| 9,738,168 B2 | 8/2017 | Penilla et al. |
| 9,747,792 B2 | 8/2017 | Boys |
| 9,766,671 B2 | 9/2017 | Dorn et al. |
| 9,778,653 B1 | 10/2017 | McClintock et al. |
| 9,806,539 B2 | 10/2017 | Kubota |
| 9,809,122 B2 | 11/2017 | McGrath et al. |
| 9,837,570 B2 | 12/2017 | Retti |
| 9,854,709 B2 | 12/2017 | Niizuma |

(56) References Cited

U.S. PATENT DOCUMENTS

| | | | |
|---|---|---|---|
| 9,873,347 B2 | 1/2018 | Brown | |
| 9,889,756 B2 | 2/2018 | Amari | |
| 9,908,426 B2 | 3/2018 | Fukushima | |
| 9,925,882 B2 | 3/2018 | Penilla et al. | |
| 9,925,887 B2 | 3/2018 | McGrath et al. | |
| 10,011,181 B2 | 7/2018 | Dudar et al. | |
| 2007/0274226 A1* | 11/2007 | Tillotson | H02J 17/00 370/252 |
| 2008/0245930 A1* | 10/2008 | Nayfeh | B64D 27/24 244/53 R |
| 2010/0039067 A1 | 2/2010 | Hill et al. | |
| 2010/0156349 A1 | 6/2010 | Littrell | |
| 2010/0161518 A1 | 6/2010 | Littrell | |
| 2010/0230197 A1 | 9/2010 | Ortmann et al. | |
| 2011/0025267 A1 | 2/2011 | Kaman et al. | |
| 2011/0204845 A1 | 8/2011 | Paparo et al. | |
| 2011/0291615 A1 | 12/2011 | Pandya et al. | |
| 2011/0301795 A1 | 12/2011 | Failing | |
| 2011/0302078 A1 | 12/2011 | Failing | |
| 2012/0005031 A1 | 1/2012 | Jammer | |
| 2012/0005125 A1 | 1/2012 | Jammer | |
| 2012/0043931 A1 | 2/2012 | Terao et al. | |
| 2012/0055751 A1 | 3/2012 | Vollenwyder et al. | |
| 2012/0203410 A1 | 8/2012 | Wechlin et al. | |
| 2012/0217112 A1 | 8/2012 | Zengerle | |
| 2012/0233062 A1 | 9/2012 | Cornish | |
| 2012/0249063 A1* | 10/2012 | Holmes | B60L 11/182 320/108 |
| 2012/0271758 A1 | 10/2012 | Jammer | |
| 2013/0033224 A1 | 2/2013 | Raedy | |
| 2013/0033228 A1 | 2/2013 | Raedy | |
| 2013/0038268 A1* | 2/2013 | Markku | H01L 31/022433 320/101 |
| 2013/0038276 A1 | 2/2013 | Raedy | |
| 2013/0076902 A1 | 3/2013 | Gao et al. | |
| 2013/0105264 A1 | 5/2013 | Ruth et al. | |
| 2013/0154553 A1 | 6/2013 | Steele | |
| 2013/0175973 A1 | 7/2013 | Power et al. | |
| 2013/0211988 A1 | 8/2013 | Dorn et al. | |
| 2013/0248311 A1 | 9/2013 | Czainski et al. | |
| 2013/0249470 A1 | 9/2013 | Martin et al. | |
| 2013/0249682 A1 | 9/2013 | Van Wiemeersch et al. | |
| 2013/0257144 A1 | 10/2013 | Caldeira et al. | |
| 2013/0257145 A1 | 10/2013 | Caldeira et al. | |
| 2013/0328387 A1 | 12/2013 | Venkateswaran et al. | |
| 2014/0012448 A1 | 1/2014 | Tripathi et al. | |
| 2014/0042752 A1 | 2/2014 | McDermott | |
| 2014/0062392 A1 | 3/2014 | Lofy et al. | |
| 2014/0067660 A1 | 3/2014 | Cornish | |
| 2014/0070767 A1 | 3/2014 | Morris et al. | |
| 2014/0088804 A1 | 3/2014 | Hyde et al. | |
| 2014/0089064 A1 | 3/2014 | Hyde et al. | |
| 2014/0217975 A1 | 8/2014 | Hayashi | |
| 2014/0232331 A1 | 8/2014 | Stamenic et al. | |
| 2014/0239891 A1 | 8/2014 | Martin et al. | |
| 2014/0278104 A1 | 9/2014 | Proietty et al. | |
| 2014/0333256 A1 | 11/2014 | Widmer et al. | |
| 2015/0002094 A1 | 1/2015 | Haddad et al. | |
| 2015/0028807 A1 | 1/2015 | Mashinsky | |
| 2015/0035484 A1 | 2/2015 | Mashinsky | |
| 2015/0041598 A1* | 2/2015 | Nugent | H02J 17/00 244/53 R |
| 2015/0042211 A1 | 2/2015 | Pan | |
| 2015/0088352 A1 | 3/2015 | Gunter | |
| 2015/0094887 A1 | 4/2015 | Kawashima | |
| 2015/0097530 A1 | 4/2015 | Scarlatti et al. | |
| 2015/0137801 A1 | 5/2015 | Raedy et al. | |
| 2015/0233962 A1* | 8/2015 | Tchoryk | G01P 5/26 356/28.5 |
| 2015/0314695 A1 | 11/2015 | McGrath et al. | |
| 2015/0321570 A1 | 11/2015 | Cun | |
| 2015/0333540 A1 | 11/2015 | Niizuma | |
| 2015/0336677 A1 | 11/2015 | Smaoui et al. | |
| 2016/0009255 A1 | 1/2016 | Droste | |
| 2016/0025960 A1* | 1/2016 | Theberge | G02B 23/06 359/365 |
| 2016/0049831 A1* | 2/2016 | Nakano | H02J 17/00 307/104 |
| 2016/0129793 A1 | 5/2016 | Cronie | |
| 2016/0144735 A1 | 5/2016 | Haddad et al. | |
| 2016/0272074 A1 | 9/2016 | McGrath et al. | |
| 2016/0290832 A1 | 10/2016 | Raedy et al. | |
| 2016/0303980 A1 | 10/2016 | Cyr et al. | |
| 2017/0026122 A1* | 1/2017 | Everett | H04B 10/118 |
| 2017/0028854 A1 | 2/2017 | Lee et al. | |
| 2017/0072808 A1 | 3/2017 | Caldeira | |
| 2017/0141368 A1 | 5/2017 | Ricci | |
| 2017/0142872 A1 | 5/2017 | Ricci | |
| 2017/0183095 A1* | 6/2017 | Liu | B64C 39/024 |
| 2018/0037136 A1 | 2/2018 | Nelson et al. | |
| 2018/0201152 A1 | 7/2018 | Newman et al. | |

FOREIGN PATENT DOCUMENTS

| | | | |
|---|---|---|---|
| EP | 2711876 | 3/2014 | |
| JP | 2010166675 A * | 7/2010 | B60L 3/0015 |
| KR | 2017-0045908 | 4/2017 | |
| WO | WO 2010/000495 | 1/2010 | |
| WO | WO 2011/045883 | 4/2011 | |
| WO | WO 2011/106506 | 9/2011 | |

OTHER PUBLICATIONS

U.S. Appl. No. 14/954,484, filed Nov. 30, 2015, Ricci.
U.S. Appl. No. 14/979,158, filed Dec. 22, 2015, Ricci.
U.S. Appl. No. 14/981,368, filed Dec. 28, 2015, Ricci.
U.S. Appl. No. 15/010,701, filed Jan. 29, 2016, Ricci.
U.S. Appl. No. 15/010,921, filed Jan. 29, 2016, Ricci.
U.S. Appl. No. 15/044,940, filed Feb. 16, 2016, Ricci.
U.S. Appl. No. 15/048,307, filed Feb. 19, 2016, Ricci.
U.S. Appl. No. 15/143,083, filed Apr. 29, 2016, Ricci.
"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Someday Your EV Charger May Be the Roadway Itself," MIT Technology Review, 2013, retrieved from http://www.technologyreview.com/news/521761/someday-your-ev-charger-may-be-the-roadway-itself/, 2 pages.
"Wireless Charging for Electric Vehicles," brochure, QUALCOMM HALO, 2011, 6 pages.
"Wireless Charging," PowerbyProxi, 2015, retrieved from https://powerbyproxi.com/wireless-charging/, 5 pages.
Brachmann, Wireless induction charging is coming to electric vehicles, IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin, "Cutting the cord: Ars goes hands-on with Qualcomm Halo wireless car charging," Ars Technica, 2015, retrieved from http://arstechnica.com/cars/2015/04/cutting-the-cord-ars-goes-hands-on-with-qualcomm-halo-wireless-car-charging/, 5 pages.
Gordon-Bloomfield, "Infiniti Delays LE Electric Sedan Production Plans," PluginCars.com, 2013, retrieved from http://www.plugincars.com/print/127405, 2 pages.
Greimel, "Nissan's next Evs: More mainstream, better battery," Automotive News, 2014, retrieved from http://www.autonews.com/article/20140507/OEM05/140509845?template=printart, 2 pages.
Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.
Ivanco et al., "Wireless Charging Panel," EV Roadmap 7, 2014, 15 pages.

(56) References Cited

OTHER PUBLICATIONS

Li et al., "Energy Management and Control of Electric Vehicle Charging Stations," Electric Power Components and Systems, 2014, vol. 42(3-4), pp. 339-347.
Marks, "Wireless Charging for Electric vehicles hits the road," New Scientist, 2014, Issue 2953, retrieved from https://www.newscientist.com/article/mg22129534-900-wireless-charging-for-electric-vehicles-hits-the-road/, 2 pages.
Morris, "What's up with wireless EV charging," Charged Evs, 2013, retrieved from https://chargedevs.com/features/whats-wireless-ev-charging/, 9 pages.
Rim, "Wireless Power Transfer Systems for Roadway-powered Electric Vehicles," IEEE, 2014, retrieved from http://tec.ieee.org/2014/09/02/wireless-power-transfer-systems-roadway-powered-electric-vehicles/, 6 pages.
Stewart, "2014 Infiniti EV to Debut Wireless Inductive Charging System," Popular Mechanics, 2011, retrieved from http://www.popularmechanics.com/cars/hybrid-electric/a7331/2014-infiniti-ev-to-debut-wireless-inductive-charging-system/, 4 pages.
Szondy, "BMW developing wireless inductive charging system for electric vehicles," gizmag.com, 2014, retrieved from http://newatlas.com/bmw-induction-charging/32863/, 4 pages.
Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.
Official Action for U.S. Appl. No. 15/010,921, dated Jan. 12, 2018, 32 pages.
Official Action for U.S. Appl. No. 15/044,940, dated Jan. 19, 2018 30 pages.
Official Action for U.S. Appl. No. 15/143,0836, dated Oct. 23, 2017 16 pages.
Official Action for U.S. Appl. No. 15/010,701, dated Apr. 9, 2018, 17 pages.
Final Action for U.S. Appl. No. 15/010,921, dated Jun. 1, 2018, 17 pages.
Final Action for U.S. Appl. No. 15/044,940, dated May 31, 2018 18 pages.
Final Action for U.S. Appl. No. 15/143,0836, dated May 10, 2018 18 pages.
Notice of Allowance for U.S. Appl. No. 15/010,701, dated Sep. 18, 2018, 14 pages.
Notice of Allowance for U.S. Appl. No. 15/010,701, dated Oct. 3, 2018, 4 pages.
Official Action for U.S. Appl. No. 15/010,921, dated Sep. 21, 2018, 18 pages.
Final Action for U.S. Appl. No. 15/044,940, dated Nov. 19, 2018 18 pages.
Final Action for U.S. Appl. No. 15/010,921, dated Jan. 25, 2019, 21 pages.
Official Action for U.S. Appl. No. 15/143,083, dated Jan. 14, 2019 19 pages.
Notice of Allowance for U.S. Appl. No. 15/044,940, dated Jun. 24, 2019 9 pages.
Official Action for U.S. Appl. No. 15/143,083, dated Aug. 7, 2019 22 pages.

\* cited by examiner

| Charging Type | Compatible Vehicle Charging Panel Types | Compatible Vehicle Storage Units | Available Automation Level | Charging Service Status | Charge Rate | Cost | Other | Shielding |
|---|---|---|---|---|---|---|---|---|
| Station: manual | Roof, Side | x, z | Low | Up | Low | $100 | A, B, C | On |
| Station: manual | Roof, Side | x, z | Low | Up | Medium | $150 | A, C | On |
| Station: manual | Roof, Side | x, z | Low | Up | High | $400 | A, B, C | On |
| Station: robotic | Roof, Side | x, z | Medium | Down | Medium | $150 | A, B, D | On |
| Station: robotic | Roof, Side | x, z | High | Down | High | $500 | B, D | On |
| Station: robotic | Roof, Side | x, z | High | Down | High | $500 | B, C | On |
| Roadway | Side, Lower | x, z | Low | Up | Low | $50 | A, C, E | Off |
| Roadway | Side, Lower | x, z | Medium | Up | Low | $100 | A, C, E | Off |
| Roadway | Side, Lower | x, y | Medium | Up | Low | $100 | A, C, E | Off |
| Emergency: truck | Roof, Side, Lower | x, y | Low | Up | Low | $150 | A, B | Off |
| Emergency: truck | Roof, Side, Lower | x, y | Medium | Up | Medium | $200 | A, B | Off |
| Emergency: truck | Roof, Side, Lower | x | Medium | Up | High | $500 | A, D | Off |
| Emergency: UAV | Roof | x | Medium | Down | Medium | $500 | A, B, C | Off |
| Emergency: UAV | Roof | x | High | Down | High | $800 | B | Off |
| Emergency: UAV | Roof | x, y | High | Down | High | $800 | B | Off |
| Overhead | Roof | x, y | Low | Up | Low | $150 | B, D | Off |
| Overhead | Roof | x, y | Medium | Up | Low | $200 | B, C | Off |
| Overhead | Roof | x, y | Medium | Up | Low | $200 | B, C | Off |

Fig. 3

ELECTRIC VEHICLE OPTICAL CHARGING SYSTEM AND METHOD OF USE

CROSS REFERENCE TO RELATED APPLICATIONS

The present application claims the benefits of and priority, under 35 U.S.C. §119(e), to U.S. Provisional Application Ser. No. 62/255,214, filed on Nov. 13, 2015, entitled "Electric Vehicle Systems and Operation"; 62/259,536, filed Nov. 24, 2015, entitled "Charging Transmission Line Under Roadway for Moving Electric Vehicle"; 62/266,452, filed Dec. 11, 2015, entitled "Charging Transmission Line Under Roadway for Moving Electric Vehicle"; 62/269,764, filed Dec. 18, 2015, entitled "Conditional Progressive Degradation of Electric Vehicle Power Supply System"; 62/300,606, filed Feb. 26, 2016, entitled "Charging Transmission Line Under Roadway for Moving Electric Vehicle"; and 62/310,387, filed Mar. 18, 2016, entitled "Distributed Processing Network for Rechargeable Electric Vehicle Tracking and Routing." The entire disclosures of the applications listed above are hereby incorporated by reference, in their entirety, for all that they teach and for all purposes.

This application is also related to U.S. patent application Ser. No. 14/954,436, filed on Nov. 30, 2015, entitled "Electric Vehicle Roadway Charging System and Method of Use" (Attorney Docket No. 8322-2); Ser. No. 14/954,484, filed on Nov. 30, 2015, entitled "Electric Vehicle Charging Device Positioning and Method of Use" (Attorney Docket No. 8322-3); Ser. No. 14/979,158, filed on Dec. 22, 2015, entitled "Electric Vehicle Charging Device Alignment and Method of Use" (Attorney Docket No. 8322-4); Ser. No. 14/981,368, filed on Dec. 28, 2015, entitled "Electric Vehicle Charging Device Obstacle Avoidance and Warning System and Method of Use" (Attorney Docket No. 8322-5); Ser. No. 15/010,701, filed on Jan. 29, 2016, entitled "Electric Vehicle Emergency Charging System and Method of Use" (Attorney Docket No. 8322-7); Ser. No. 15/010,921, filed on Jan. 29, 2016, entitled "Electric Vehicle Aerial Vehicle Charging System and Method of Use" (Attorney Docket No. 8322-8); Ser. No. 15/044,940, filed on Feb. 16, 2016, entitled "Electric Vehicle Overhead Charging System and Method of Use" (Attorney Docket No. 8322-11); Ser. No. 15/048,307, filed on Feb. 19, 2016, entitled "Electric Vehicle Charging Station System and Method of Use" (Attorney Docket No. 8322-10); and Ser. No. 15/143,083, filed on Apr. 29, 2016, entitled "Vehicle to Vehicle Charging System and Method of Use" (Attorney Docket No. 8322-16). The entire disclosures of the applications listed above are hereby incorporated by reference, in their entirety, for all that they teach and for all purposes.

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 3 is a diagram of an embodiment of a data structure for storing information about a vehicle in an environment;

Figure 1:
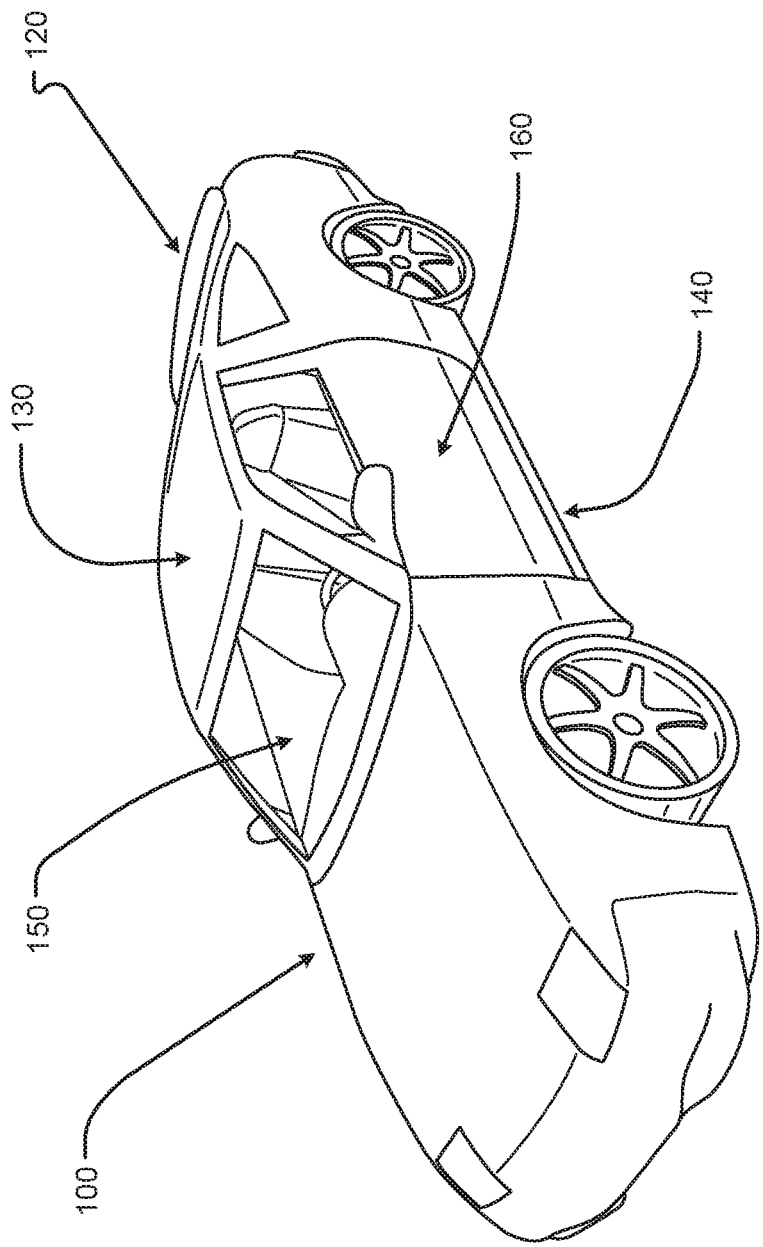
FIG. 1 shows a vehicle in accordance with embodiments of the present disclosure.

To assist in the understanding of the present invention the following list of components and associated numbering found in the drawings is provided herein:

| # | Component |
|---|---|
| 10 | System |
| 100 | Vehicle |
| 110 | Vehicle front |
| 120 | Vehicle aft |
| 130 | Vehicle roof |
| 140 | Vehicle undercarriage |
| 150 | Vehicle interior |
| 160 | Vehicle side |
| 210 | Vehicle database |
| 220 | Vehicle driver |
| 230 | Vehicle passengers |
| 240 | Remote operator system |
| 250 | Roadway system |
| 254 | Robotic charging system |
| 258 | Overhead charging system |
| 260 | Roadway vehicles |
| 270 | Emergency charging vehicle system |
| 280 | Aerial vehicle charging system |
| 290 | Autonomous environment |
| 300 | Data structure |
| 310A-M | Data structure fields |
| 400 | Instrument panel |
| 410 | Steering wheel |
| 420 | Vehicle operational display |
| 424 | Auxiliary display |
| 428 | Power management display |
| 432 | Charging manual controller |
| 434 | Head-up display |
| 504 | Roadway |
| 516 | (Charging) Power source |
| 520 | Charging plate |
| 520A-C | Roadway charging areas |
| 530 | Direction one |
| 532 | Direction two |
| 540A | Parking space |
| 540B | Traffic controlled space |
| 608 | Charging panel (retracted) |
| 608' | Charging panel (deployed) |
| 610 | Charging panel controller |
| 612 | Energy storage unit |
| 622 | Charge provider controller |
| 624 | Transmission line |
| 626 | Vehicle sensors |
| 700 | Robotic unit |
| 704 | Robotic unit arm |
| 713 | Robotic unit database |
| 810 | Tower |
| 814 | First wire |
| 818 | Second wire |

-continued

| # | Component |
|---|---|
| 820 | Pantograph |
| 824 | Overhead contact |
| 834 | Overhead charging data structure |
| 910 | Roadway passive vehicles |
| 920 | Roadway active vehicles |
| 921 | Charging vehicle |
| 922 | Charging vehicle arm |
| 923 | Charging vehicle arm controller |
| 924 | Distance Sensor |
| 925 | Receiving vehicle |
| 1010 | Tether |
| 1140 | Charging cable |
| 1150 | Connector |
| 1204 | Frame |
| 1208 | Body (Panels) |
| 1308 | Power Source |
| 1308A | First Power Source |
| 1308B | Second Power Source |
| 1312 | Electric Motor |
| 1314 | Motor Controller |
| 1316 | Bumpers |
| 1316A | Front Bumper |
| 1316B | Rear Bumper |
| 1320 | Drive Wheel |
| 1324 | Charge Controller |
| 1328 | Electrical Interconnection |
| 1332 | Redundant Electrical Interconnection |
| 1336 | Energy Recovery System |
| 1402 | Broken Section |
| 1404 | Charging Plug/Receptacle |
| 1408 | Power Transmission Interconnection |
| 1412 | Inductive Charger |
| 1500 | Electrical system |
| 1504 | Power Generation Unit |
| 1508 | Loads |
| 1512 | Billing and Cost unit |
| 1604 | Generator power source |
| 1608 | Wired or wireless charging power source |
| 1612 | Regenerative braking system |
| 1616 | Solar array |
| 1618 | Electrical Interconnection |
| 1620 | Power source interface |
| 1624 | Electrical Interface |
| 1628 | Mechanical Interface |
| 1632 | Electrical Converter |
| 1638 | Conditioner |
| 1704 | Battery and/or capacitors |
| 1708 | Charge Management unit |
| 1804 | Electric motor |
| 1808 | User interaction loads |
| 1812 | Environmental loads |
| 1816 | Sensor loads |
| 1820 | Safety loads |
| 2000 | Vehicle to vehicle charging system |
| 2100 | Vehicle to vehicle control system |
| 2200 | Graphical user interface |
| 2204 | Display device |
| 2208 | Feedback adjustment image one |
| 2208' | Feedback adjustment image two |
| 2212 | (Charging) Power Source centerline icon |
| 2216 | (Charging) Power Source icon |
| 2220 | Charging Plate centerline icon |
| 2224 | Alignment instruction |
| 2334 | Vehicle to vehicle charging system data structure |
| 2400 | Optical charging system |
| 2410 | Optical charging station |
| 2420 | Optical charging station base |
| 2422 | Optical charging station antenna controller |
| 2424 | Optical charging station antenna |
| 2430 | Optical charging station signal |
| 2450 | Optical charge receiving vehicle |
| 2452 | Receiving vehicle antenna/PV array controller |
| 2454 | Receiving vehicle antenna |
| 2456 | Receiving vehicle PV array |
| 2458 | Receiving vehicle converter |
| 2460 | Receiving vehicle signal |
| 2470 | Vehicle optical charging data structure |

| # | Component |
|---|---|
| 2475A-O | Vehicle optical charging data structure fields |

SUMMARY

The disclosure provides a system and method of use to provide electric vehicle charging. Specifically, systems and methods to provide charging through induction are presented.

In one embodiment, a system for vehicle optical charging is disclosed, the system comprising: an optical charging station configured to transmit an optical signal, the optical charging station comprising a directive element configured to direct the transmitted optical signal; and a receiving vehicle comprising an electrical storage unit and a receiver configured to receive the transmitted optical signal, the receiver in electrical communication with the electrical storage unit; wherein the received optical signal enables charging of the electrical storage unit.

In another embodiment, a method for vehicle optical charging, the method comprising: determining, by a microprocessor, if an optical charging station is available for charging of a receiving vehicle; requesting, by the microprocessor, transmission of an optical signal from the optical charging station to a receiver of the receiving vehicle; orienting, by the microprocessor, the receiver to receive the optical signal; transmitting, by the optical station, the optical signal to the receiver; and receiving, by the receiver, the transmitted optical signal, the receiver in electrical communication with a receiving vehicle electrical storage unit; wherein the received optical signal enables charging of the receiving vehicle electrical storage unit. The method for vehicle optical charging may further comprise selecting, by the microprocessor, a type of optical signal.

The term "laser" and variations thereof, as used herein, refers to a device that emits light through the stimulated emission of electromagnetic radiation.

The term "laser diode", "LD" and variations thereof, as used herein, refers to a laser electrically-pumped by a semiconductor diode.

The term "laser pumping" and variations thereof, as used herein, means the act of transferring energy into the gain medium of a laser.

The term "lase" and variations thereof means to give off or emit laser light.

The term "light emitting diode", "light-emitting diode", "LED" and variations thereof, as used herein, refers to a semiconductor diode that emits light.

The term "gain medium" and variations thereof, as used herein, means a source of optical gain as used in a laser.

The term "PV" means photovoltaic and generally refers to a means or method of converting light or solar energy into electricity.

The term "PV array" means at assembly of PV cells or modules.

In some embodiments of the system and/or method for vehicle optical charging further comprises: wherein the receiver is interconnected to the receiving vehicle and configured to operate in a plurality of states comprising a retracted state and a deployed state; the receiving vehicle further comprising an actuator interconnected to the receiver and to the receiving vehicle, wherein the actuator is configured to orient the receiver to receive the transmitted optical signal; wherein the receiver is one of an antenna and a PV array; wherein the receiving vehicle is an electrically-powered vehicle; wherein the receiving vehicle further comprises a controller that determines if the receiving vehicle requires charging; wherein the directive element comprises a station antenna; wherein the optical charging station further comprises a station controller configured track a position of the receiver of the receiving vehicle; wherein the station controller directs the station antenna to the tracked position of the receiver of the receiving vehicle; wherein the transmitted optical signal is a laser signal; wherein charging is performed while the receiving vehicle is in motion; and wherein the actuator is configured to orient the receiver in a pitch and a yaw rotational position.

DETAILED DESCRIPTION

Embodiments of the present disclosure will be described in connection with a vehicle, and in accordance with one exemplary embodiment an electric vehicle and/or hybrid-electric vehicle and associated systems.

With attention to FIGS. 1-26, embodiments of the electric vehicle system 10 and method of use are depicted.

Referring to FIG. 1, the electric vehicle system comprises electric vehicle 100. The electric vehicle 100 comprises vehicle front 110, vehicle aft 120, vehicle roof 130, vehicle side 160, vehicle undercarriage 140 and vehicle interior 150.

Figure 2:
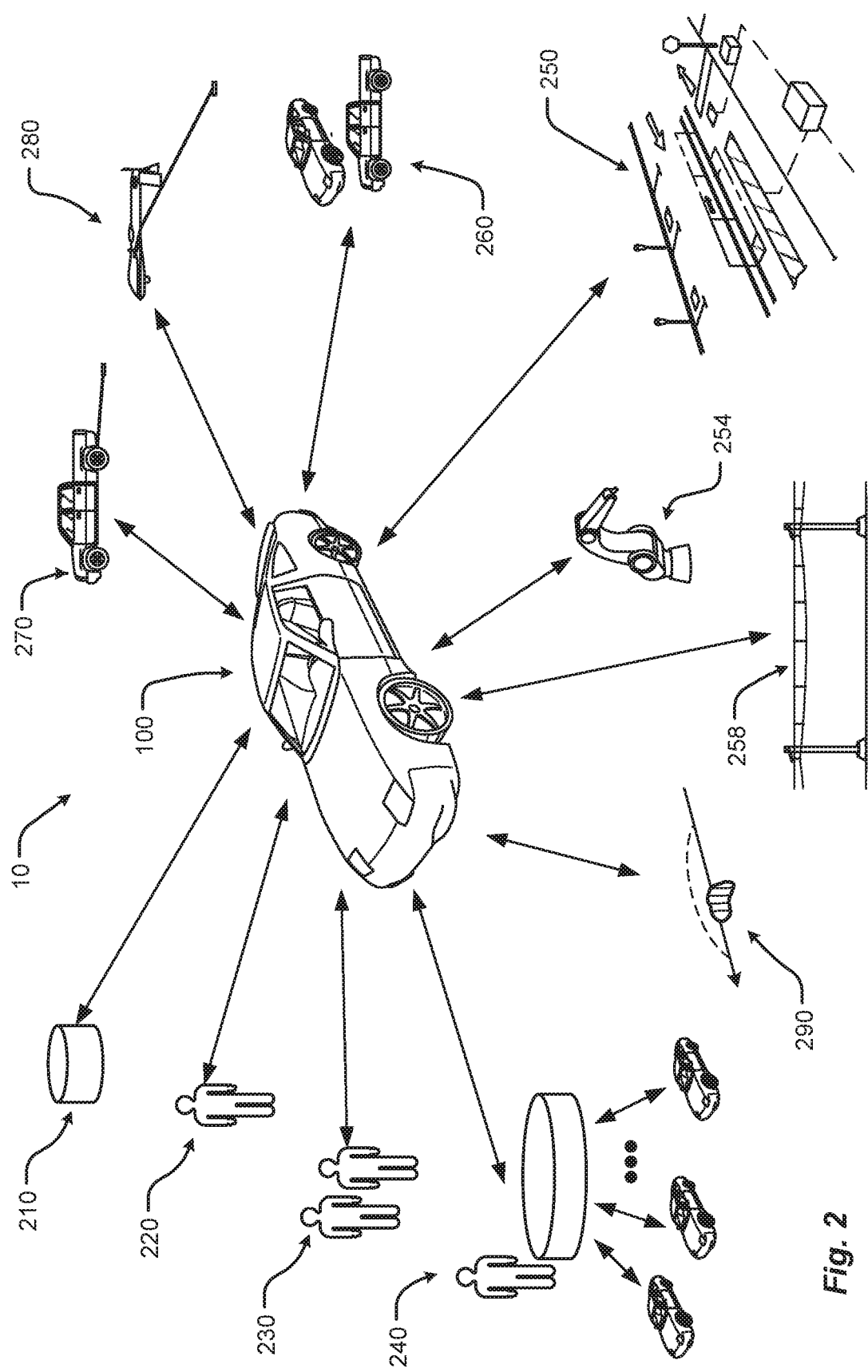
FIG. 2 shows a vehicle in an environment in accordance with embodiments of the present disclosure.

Referring to FIG. 2, the vehicle 100 is depicted in a plurality of exemplary environments. The vehicle 100 may operate in any one or more of the depicted environments in any combination. Other embodiments are possible but are not depicted in FIG. 2. Generally, the vehicle 100 may operate in environments which enable charging of the vehicle 100 and/or operation of the vehicle 100. More specifically, the vehicle 100 may receive a charge via one or more means comprising emergency charging vehicle system 270, aerial vehicle charging system 280, roadway system 250, robotic charging system 254 and overhead charging system 258. The vehicle 100 may interact and/or operate in an environment comprising one or more other roadway vehicles 260. The vehicle 100 may engage with elements within the vehicle 100 comprising vehicle driver 220, vehicle passengers 220 and vehicle database 210. In one embodiment, vehicle database 210 does not physically reside in the vehicle 100 but is instead accessed remotely, e.g. by wireless communication, and resides in another location such as a residence or business location. Vehicle 100 may operate autonomously and/or semi-autonomously in an autonomous environment 290 (here, depicted as a roadway environment presenting a roadway obstacle of which the vehicle 100 autonomously identifies and steers the vehicle 100 clear of the obstacle). Furthermore, the vehicle 100 may engage with a remote operator system 240, which may provide fleet management instructions or control.

FIG. 3 is a diagram of an embodiment of a data structure 300 for storing information about a vehicle 100 in an environment. The data structure may be stored in vehicle database 210. Generally, data structure 300 identifies operational data associated with charging types 310A. The data structures 300 may be accessible by a vehicle controller. The data contained in data structure 300 enables, among other things, for the vehicle 100 to receive a charge from a given charging type.

Exemplar data comprises charging type 310A comprising a manual charging station 310J, robotic charging station 310K such as robotic charging system 254, a roadway charging system 310L such as those of roadway system 250, an emergency charging system 310M such as that of emergency charging vehicle system 270, an emergency charging system 310N such as that of aerial vehicle charging system 280, and overhead charging type 3100 such as that of overhead charging system 258.

Compatible vehicle charging panel types 310B comprise locations on vehicle 100 wherein charging may be received, such as vehicle roof 130, vehicle side 160 and vehicle lower or undercarriage 140. Compatible vehicle storage units 310C data indicates storage units types that may receive power from a given charging type 310A. Available automation level 310D data indicates the degree of automation available for a given charging type; a high level may indicate full automation, allowing the vehicle driver 220 and/or vehicle passengers 230 to not involve themselves in charging operations, while a low level of automation may require the driver 220 and/or occupant 230 to manipulate/position a vehicle charging device to engage with a particular charging type 310A to receive charging. Charging status 310E indicates whether a charging type 310A is available for charging (i.e. is "up") or is unavailable for charging (i.e. is "down"). Charge rate 310F provides a relative value for time to charge, while Cost 310G indicates the cost to vehicle 100 to receive a given charge. The Other data element 310H may provide additional data relevant to a given charging type 310A, such as a recommended separation distance between a vehicle charging plate and the charging source. The Shielding data element 310I indicates if electromagnetic shielding is recommended for a given charging type 310A and/or charging configuration. Further data fields 310P, 310Q are possible.

Figure 4A:
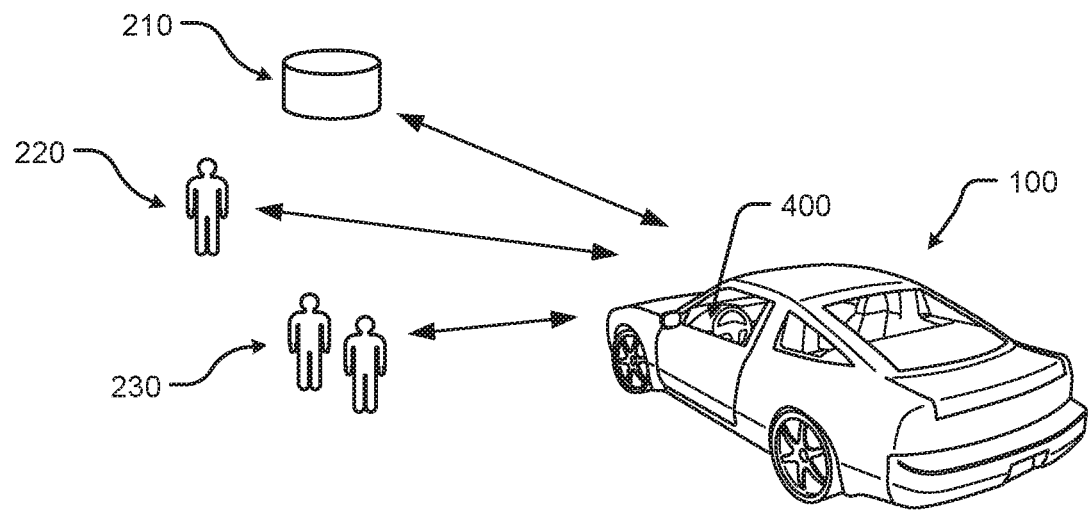
FIG. 4A shows a vehicle in a user environment in accordance with embodiments of the present disclosure.

FIG. 4A depicts the vehicle 100 in a user environment comprising vehicle database 210, vehicle driver 220 and vehicle passengers 230. Vehicle 100 further comprises vehicle instrument panel 400 to facilitate or enable interactions with one or more of vehicle database 210, vehicle driver 220 and vehicle passengers 230. In one embodiment, driver 210 interacts with instrument panel 400 to query database 210 so as to locate available charging options and to consider or weigh associated terms and conditions of the charging options. Once a charging option is selected, driver 210 may engage or operate a manual control device (e.g., a joystick) to position a vehicle charging receiver panel so as to receive a charge.

Figure 4B:
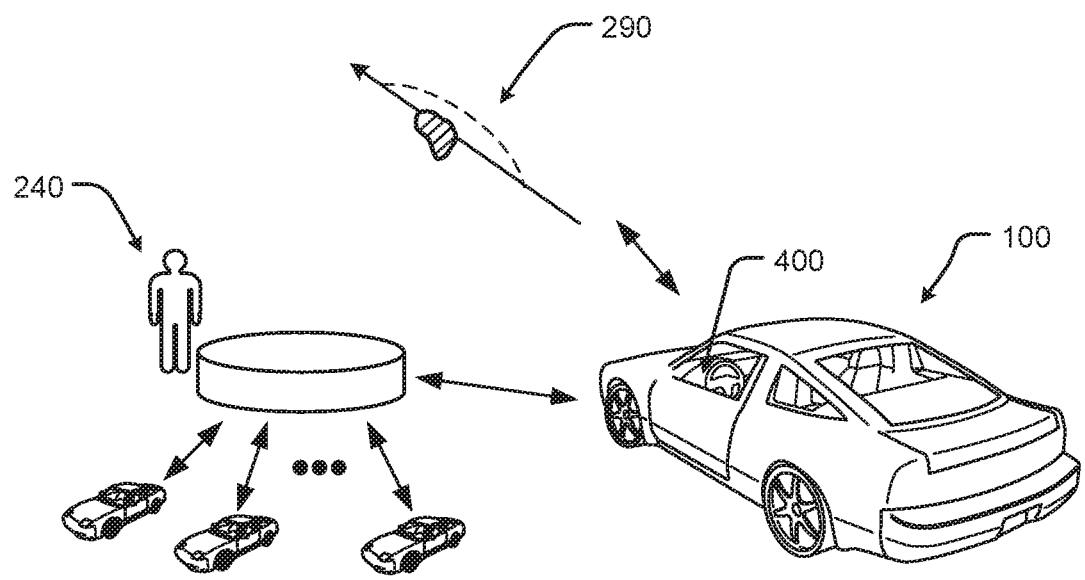
FIG. 4B shows a vehicle in a fleet management and automated operation environment in accordance with embodiments of the present disclosure.

FIG. 4B depicts the vehicle 100 in a user environment comprising a remote operator system 240 and an autonomous driving environment 290. In the remote operator system 240 environment, a fleet of electric vehicles 100 (or mixture of electric and non-electric vehicles) is managed and/or controlled remotely. For example, a human operator may dictate that only certain types of charging types are to be used, or only those charging types below a certain price point are to be used. The remote operator system 240 may comprise a database comprising operational data, such as fleet-wide operational data. In another example, the vehicle 100 may operate in an autonomous driving environment 290 wherein the vehicle 100 is operated with some degree of autonomy, ranging from complete autonomous operation to semi-automation wherein only specific driving parameters (e.g., speed control or obstacle avoidance) are maintained or controlled autonomously. In FIG. 4B, autonomous driving environment 290 depicts an oil slick roadway hazard that triggers that triggers the vehicle 100, while in an automated obstacle avoidance mode, to automatically steer around the roadway hazard.

Figure 4C:
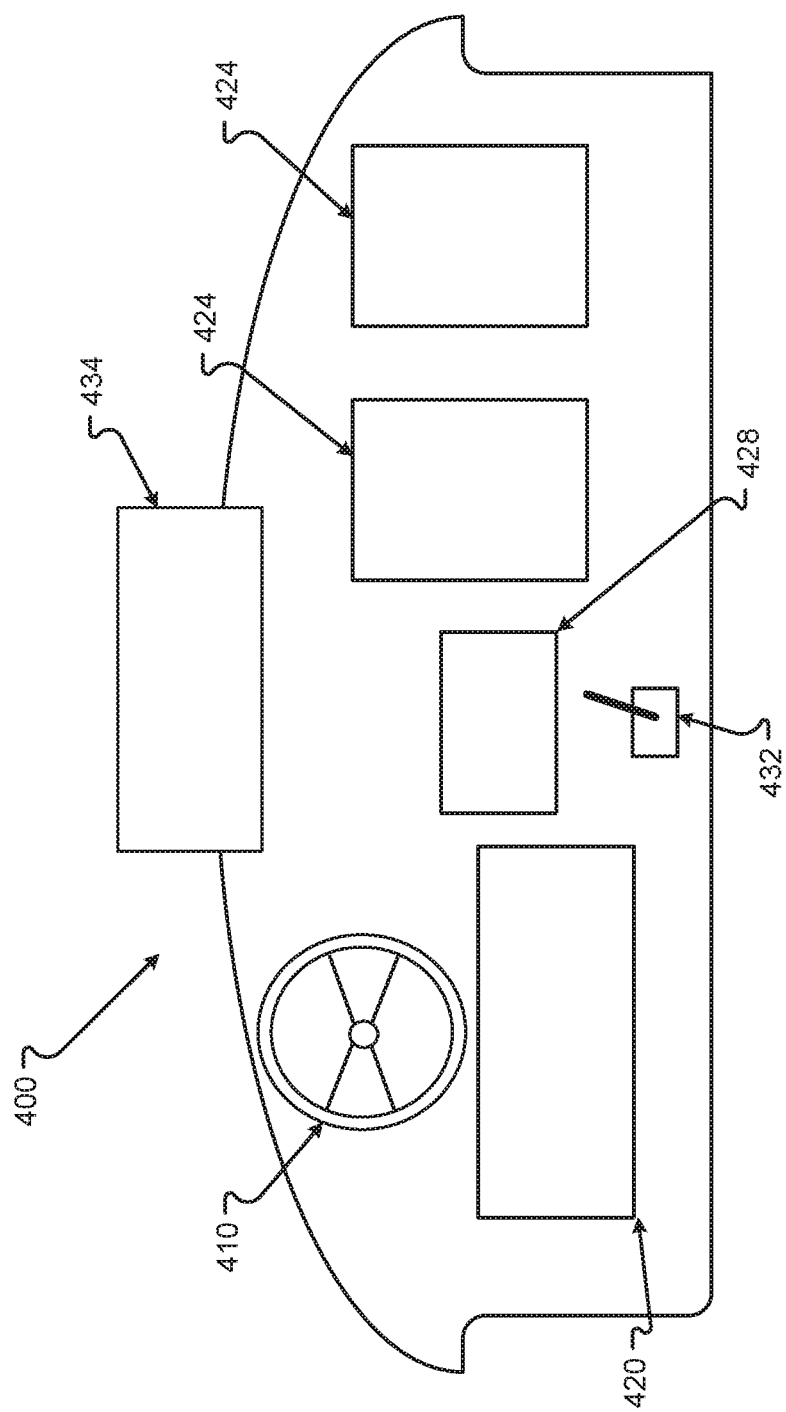
FIG. 4C shows an embodiment of the instrument panel of the vehicle according to one embodiment of the present disclosure.

FIG. 4C shows one embodiment of the vehicle instrument panel 400 of vehicle 100. Instrument panel 400 of vehicle 100 comprises steering wheel 410, vehicle operational display 420 (which would provide basic driving data such as speed), one or more auxiliary displays 424 (which may display, e.g., entertainment applications such as music or radio selections), heads-up display 434 (which may provide, e.g., guidance information such as route to destination, or obstacle warning information to warn of a potential collision, or some or all primary vehicle operational data such as speed), power management display 428 (which may provide, e.g., data as to electric power levels of vehicle 100), and charging manual controller 432 (which provides a physical input, e.g. a joystick, to manual maneuver, e.g., a vehicle charging plate to a desired separation distance). One or more of displays of instrument panel 400 may be touch-screen displays. One or more displays of instrument panel 400 may be mobile devices and/or applications residing on a mobile device such as a smart phone.

Figure 5:
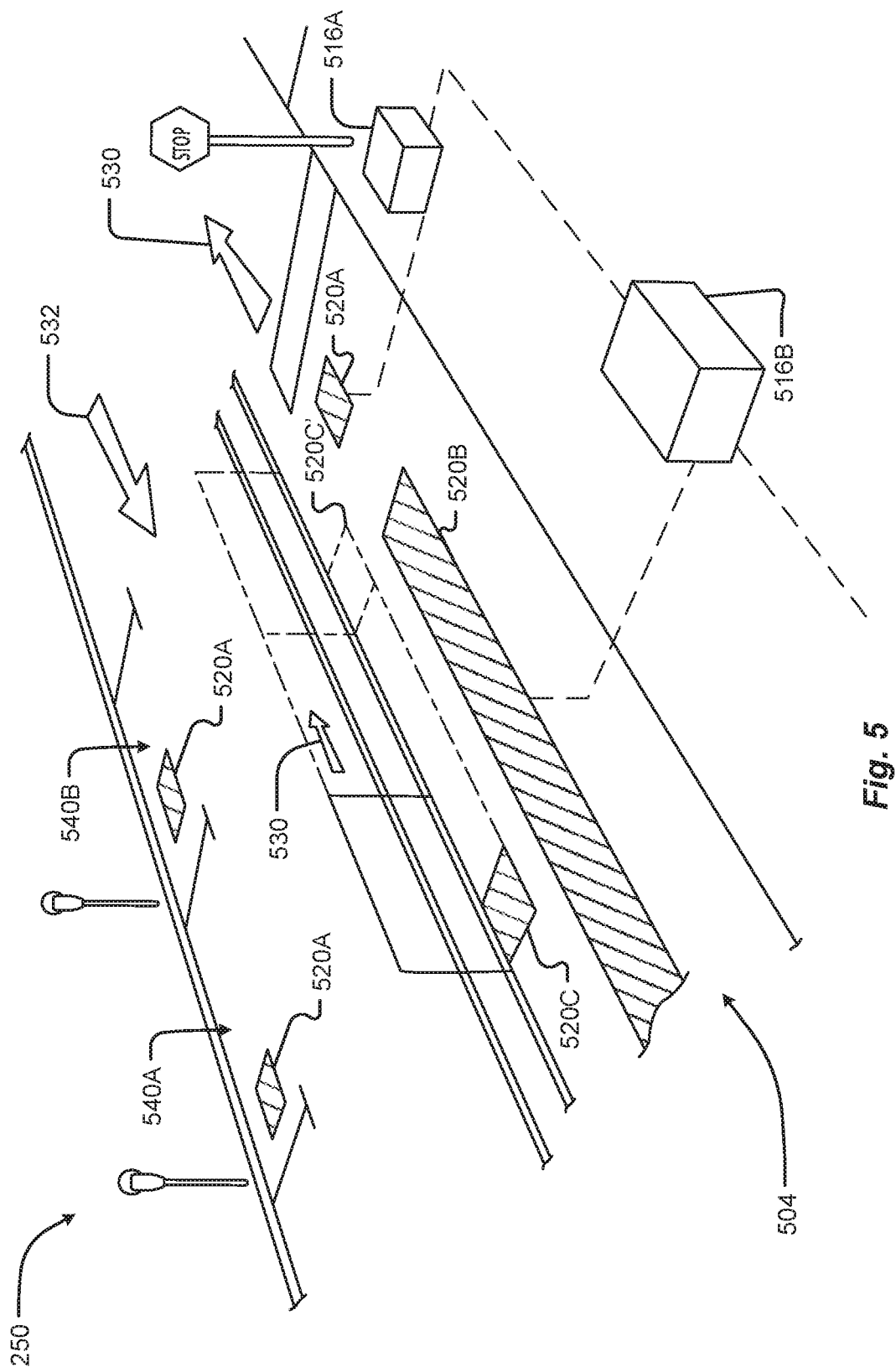
FIG. 5 shows charging areas associated with an environment in accordance with embodiments of the present disclosure.

FIG. 5 depicts a charging environment of a roadway charging system 250. The charging area may be in the roadway 504, on the roadway 504, or otherwise adjacent to the roadway 504, and/or combinations thereof. This static charging area 520B may allow a charge to be transferred even while the electrical vehicle 100 is moving. For example, the static charging area 520B may include a charging transmitter (e.g., conductor, etc.) that provides a transfer of energy when in a suitable range of a receiving unit (e.g., an inductor pick up, etc.). In this example, the receiving unit may be a part of the charging panel associated with the electrical vehicle 100.

The static charging areas 520A, 520B may be positioned a static area such as a designated spot, pad, parking space 540A, 540B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. The charging of vehicle 100 may occur by any of several means comprising a plug or other protruding feature. The power source 516A, 516B may include a receptacle or other receiving feature, and/or vice versa.

The charging area may be a moving charging area 520C. Moving charging areas 520C may include charging areas associated with one or more portions of a vehicle, a robotic charging device, a tracked charging device, a rail charging device, etc., and/or combinations thereof. In a moving charging area 520C, the electrical vehicle 100 may be configured to receive a charge, via a charging panel, while the vehicle 100 is moving and/or while the vehicle 100 is stationary. In some embodiments, the electrical vehicle 100 may synchronize to move at the same speed, acceleration, and/or path as the moving charging area 520C. In one embodiment, the moving charging area 520C may synchronize to move at the same speed, acceleration, and/or path as the electrical vehicle 100. In any event, the synchronization may be based on an exchange of information communicated across a communications channel between the electric vehicle 100 and the charging area 520C. Additionally or alternatively, the synchronization may be based on information associated with a movement of the electric vehicle 100 and/or the moving charging area 520C. In some embodiments, the moving charging area 520C may be configured to move along a direction or path 532 from an origin position to a destination position 520C'.

In some embodiments, a transformer may be included to convert a power setting associated with a main power supply to a power supply used by the charging areas 520A-C. For example, the transformer may increase or decrease a voltage associated with power supplied via one or more power transmission lines.

Figure 6:
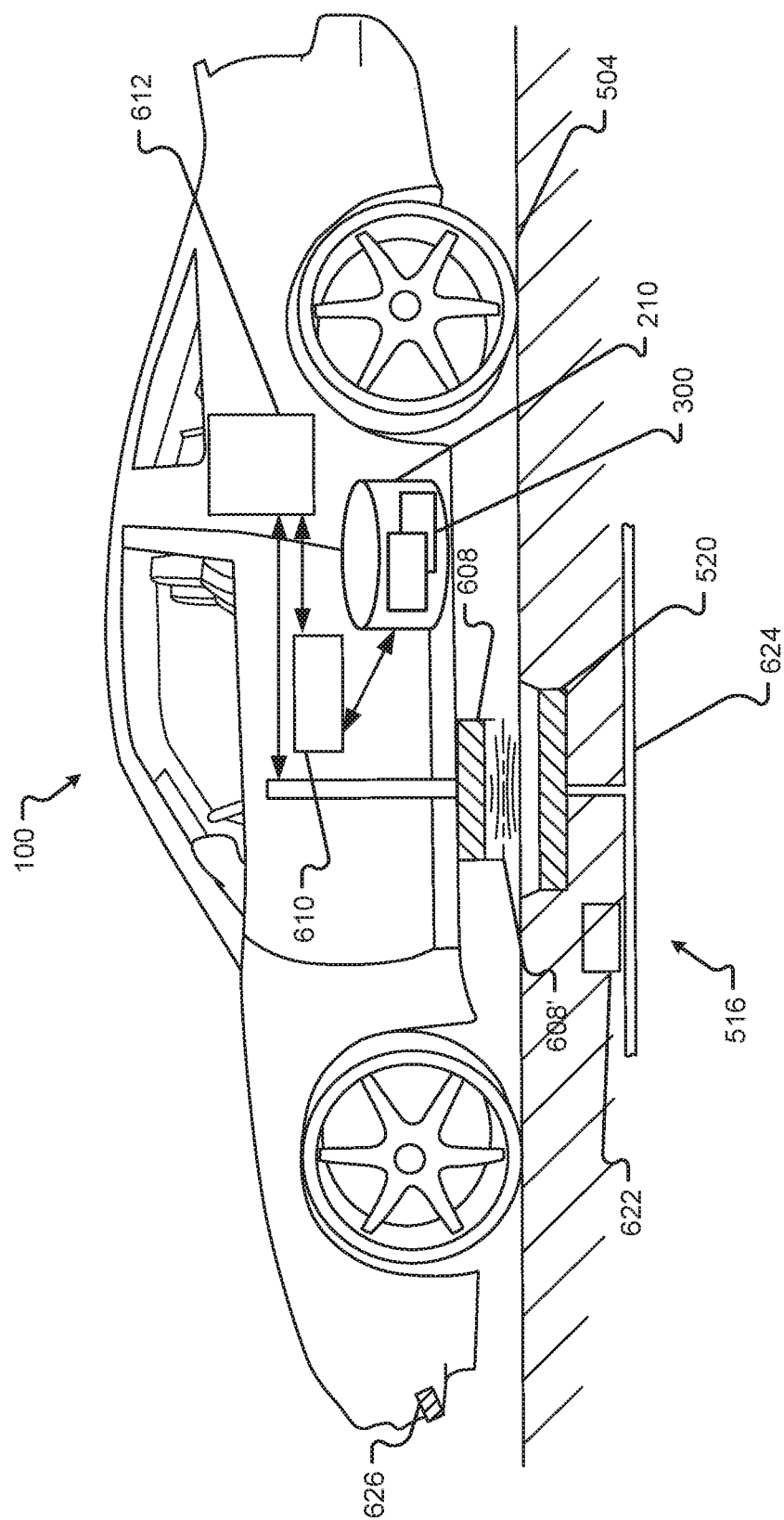
FIG. 6 shows a vehicle in a roadway charging environment in accordance with embodiments of the present disclosure.

Referring to FIG. 6, a vehicle 100 is shown in a charging environment in accordance with embodiments of the present disclosure. The system 10 comprises a vehicle 100, an electrical storage unit 612, an external power source 516 able to provide a charge to the vehicle 100, a charging panel 608 mounted on the vehicle 100 and in electrical communication with the electrical storage unit 612, and a vehicle charging panel controller 610. The charging panel controller 610 may determine if the electrical storage unit requires charging and if conditions allow for deployment of a charging panel. The vehicle charging panel 608 may operate in at least a retracted state and a deployed state (608 and 608' as shown is FIG. 6), and is movable by way of an armature.

The charging panel controller 610 may receive signals from vehicle sensors 626 to determine, for example, if a hazard is present in the path of the vehicle 100 such that deployment of the vehicle charging panel 608 is inadvisable. The charging panel controller 610 may also query vehicle database 210 comprising data structures 300 to establish other required conditions for deployment. For example, the database may provide that a particular roadway does not provide a charging service or the charging service is inactive, wherein the charging panel 108 would not be deployed.

The power source 516 may include at least one electrical transmission line 624 and at least one power transmitter or charging area 520. During a charge, the charging panel 608 may serve to transfer energy from the power source 516 to at least one energy storage unit 612 (e.g., battery, capacitor, power cell, etc.) of the electric vehicle 100.

Figure 7:
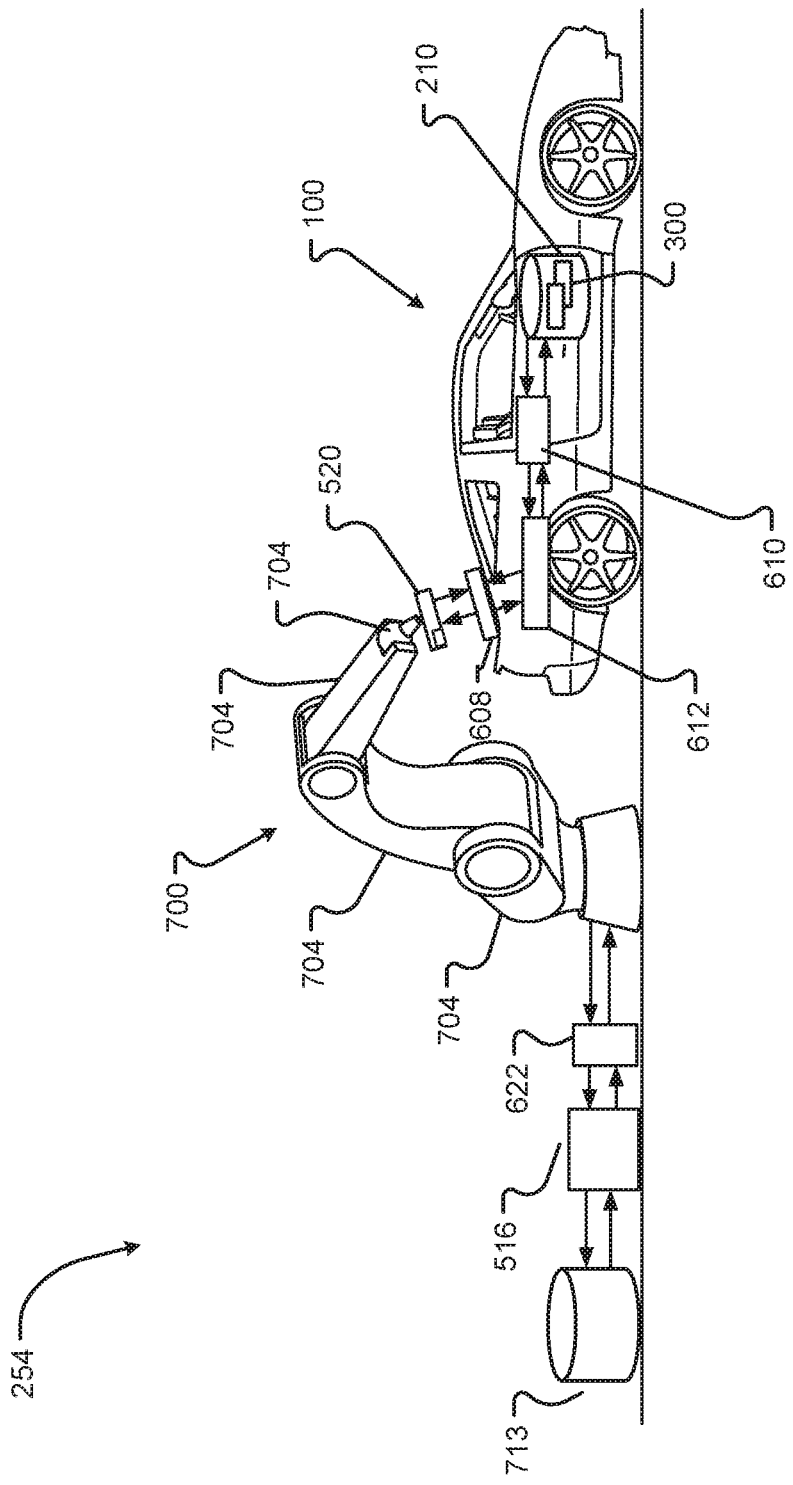
FIG. 7 shows a vehicle in a robotic charging station environment in accordance with another embodiment of the present disclosure.

FIG. 7 shows a vehicle 100 in a charging station environment 254 in accordance with another embodiment of the present disclosure. Generally, in this embodiment of the invention, charging occurs from a robotic unit 700.

Robotic charging unit 700 comprises one or more robotic unit arms 704, at least one robotic unit arm 704 interconnected with charging plate 520. The one or more robotic unit arms 704 maneuver charging plate 520 relative to charging panel 608 of vehicle 100. Charging plate 520 is positioned to a desired or selectable separation distance, as assisted by a separation distance sensor disposed on charging plate 520. Charging plate 520 may remain at a finite separation distance from charging panel 608, or may directly contact charging panel (i.e. such that separation distance is zero). Charging may be by induction. In alternative embodiments, separation distance sensor is alternatively or additionally disposed on robotic arm 704. Vehicle 100 receives charging via charging panel 608 which in turn charges energy storage unit 612. Charging panel controller 610 is in communication with energy storage unit 612, charging panel 608, vehicle database 300, charge provider controller 622, and/or any one of elements of instrument panel 400.

Robotic unit further comprises, is in communication with and/or is interconnected with charge provider controller 622, power source 516 and a robotic unit database. Power source 516 supplies power, such as electrical power, to charge plate 520 to enable charging of vehicle 100 via charging panel 608. Controller 622 maneuvers or operates robotic unit 704, either directly and/or completely or with assistance from a remote user, such as a driver or passenger in vehicle 100 by way of, in one embodiment, charging manual controller 432.

Figure 8:
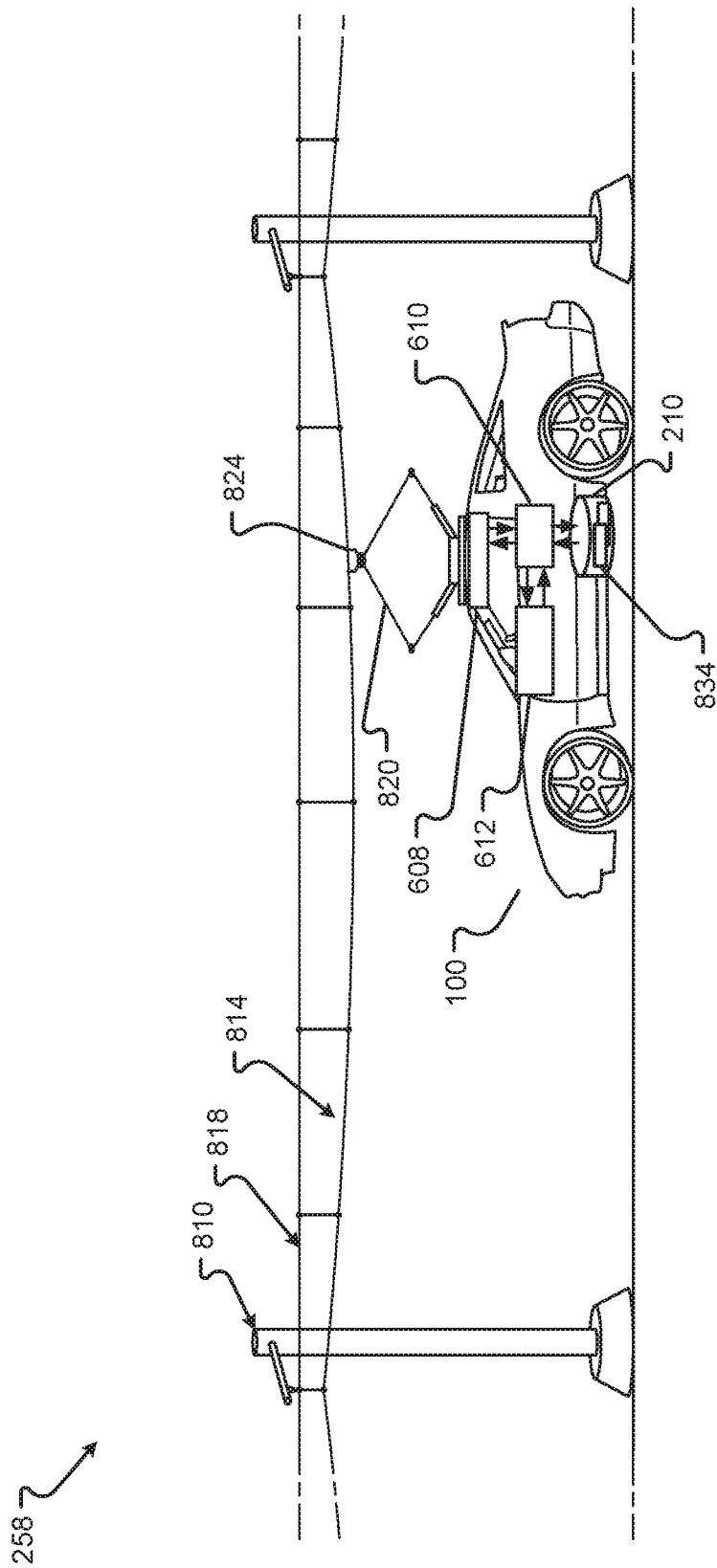
FIG. 8 shows a vehicle in an overhead charging environment in accordance with another embodiment of the present disclosure.

FIG. 8 shows a vehicle 100 in an overhead charging environment in accordance with another embodiment of the present disclosure. Generally, in this embodiment of the invention, charging occurs from an overhead towered charging system 258, similar to existing commuter rail systems. Such an overhead towered system 258 may be easier to build and repair compared to in-roadway systems. Generally, the invention includes a specially-designed overhead roadway charging system comprising an overhead charging cable or first wire 814 that is configured to engage an overhead contact 824 which provides charge to charging panel 608 which provides charge to vehicle energy storage unit 612. The overhead towered charging system 258 may further comprise second wire 818 to provide stability and structural strength to the roadway charging system 800. The first wire 814 and second wire 818 are strung between towers 810.

The overhead charging cable or first wire 814 is analogous to a contact wire used to provide charging to electric trains or other vehicles. An external source provides or supplies electrical power to the first wire 814. The charge provider comprises an energy source i.e. a provider battery and a provider charge circuit or controller in communication with the provider battery. The overhead charging cable or first wire 814 engages the overhead contact 824 which is in electrical communication with charge receiver panel 108. The overhead contact 824 may comprise any known means to connect to overhead electrical power cables, such as a pantograph 820, a bow collector, a trolley pole or any means known to those skilled in the art. Further disclosure regarding electrical power or energy transfer via overhead systems is found in US Pat. Publ. No. 2013/0105264 to Ruth entitled "Pantograph Assembly," the entire contents of which are incorporated by reference for all purposes. In one embodiment, the charging of vehicle 100 by overhead charging system 800 via overhead contact 824 is by any means know to those skilled in the art, to include those described in the above-referenced US Pat. Publ. No. 2013/0105264 to Ruth.

The overhead contact 824 presses against the underside of the lowest overhead wire of the overhead charging system, i.e. the overhead charging cable or first wire 814, aka the contact wire. The overhead contact 824 may be electrically conductive. Alternatively or additionally, the overhead contact 824 may be adapted to receive electrical power from overhead charging cable or first wire 814 by inductive charging.

In one embodiment, the receipt and/or control of the energy provided via overhead contact 824 (as connected to the energy storage unit 612) is provided by receiver charge circuit or charging panel controller 110.

Overhead contact 824 and/or charging panel 608 may be located anywhere on vehicle 100, to include, for example, the roof, side panel, trunk, hood, front or rear bumper of the charge receiver 100 vehicle, as long as the overhead contact 824 may engage the overhead charging cable or first wire 814. Charging panel 108 may be stationary (e.g. disposed on the roof of vehicle 100) or may be moveable, e.g. moveable with the pantograph 820. Pantograph 820 may be positioned in at least two states comprising retracted and extended. In the extended state pantograph 820 engages first wire 814 by way of the overhead contact 824. In the retracted state, pantograph 820 may typically reside flush with the roof of vehicle 100 and extend only when required for charging. Control of the charging and/or positioning of the charging plate 608, pantograph 820 and/or overhead contact 824 may be manual, automatic or semi-automatic (such as via controller 610); said control may be performed through a GUI engaged by driver or occupant of receiving vehicle 100 and/or driver or occupant of charging vehicle.

Figure 9:
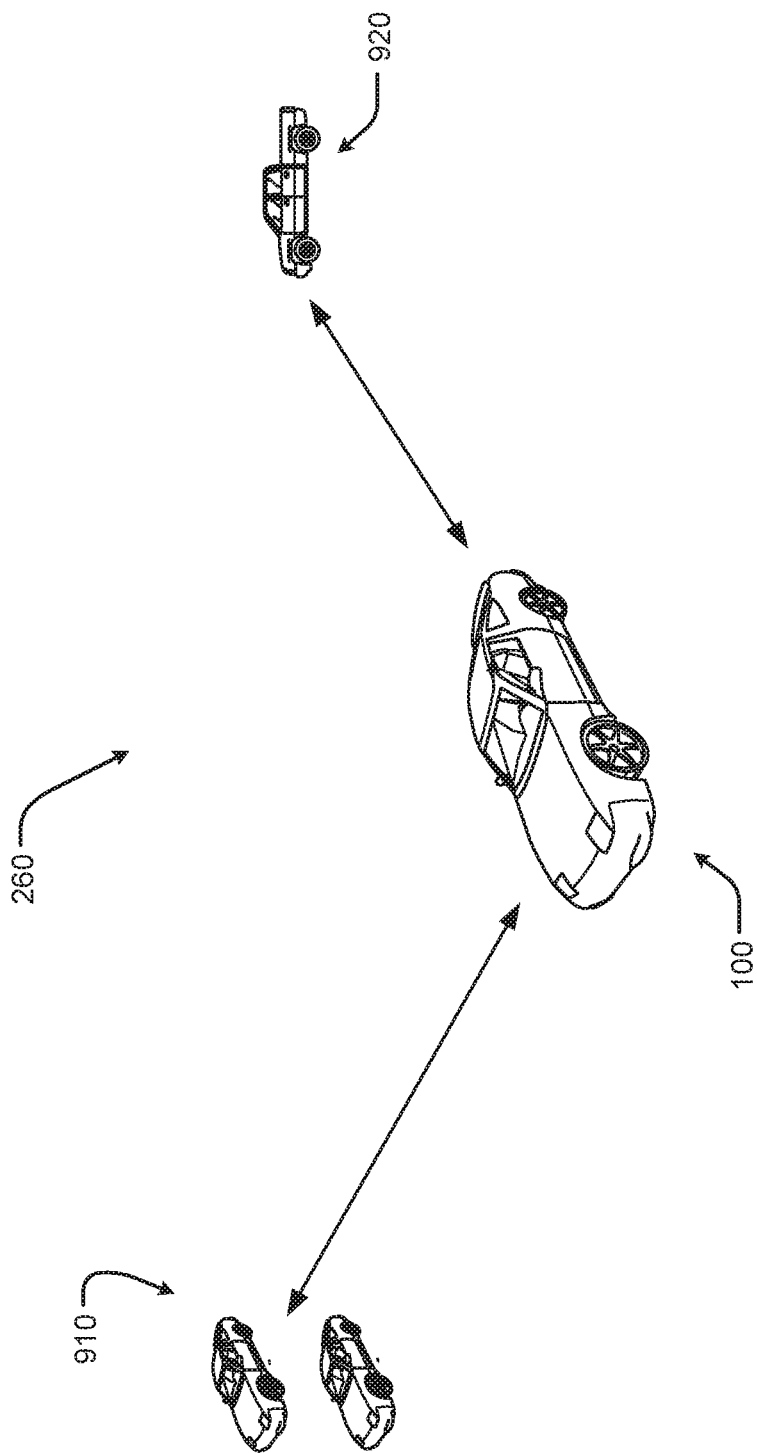
FIG. 9 shows a vehicle in a roadway environment comprising roadway vehicles in accordance with another embodiment of the present disclosure.

FIG. 9 shows a vehicle in a roadway environment comprising roadway vehicles 260 in accordance with another embodiment of the present disclosure. Roadway vehicles 260 comprise roadway passive vehicles 910 and roadway active vehicles 920. Roadway passive vehicles 910 comprise vehicles that are operating on the roadway of vehicle 100 but do no cooperatively or actively engage with vehicle 100. Stated another way, roadway passive vehicles 910 are simply other vehicles operating on the roadway with the vehicle 100 and must be, among other things, avoided (e.g., to include when vehicle 100 is operating in an autonomous or semi-autonomous manner). In contrast, roadway active vehicles 920 comprise vehicles that are operating on the roadway of vehicle 100 and have the capability to, or actually are, actively engaging with vehicle 100. For example, the emergency charging vehicle system 270 is a roadway active vehicle 920 in that it may cooperate or engage with vehicle 100 to provide charging. In some embodiments, vehicle 100 may exchange data with a roadway active vehicle 920 such as, for example, data regarding charging types available to the roadway active vehicle 920.

Figure 10:
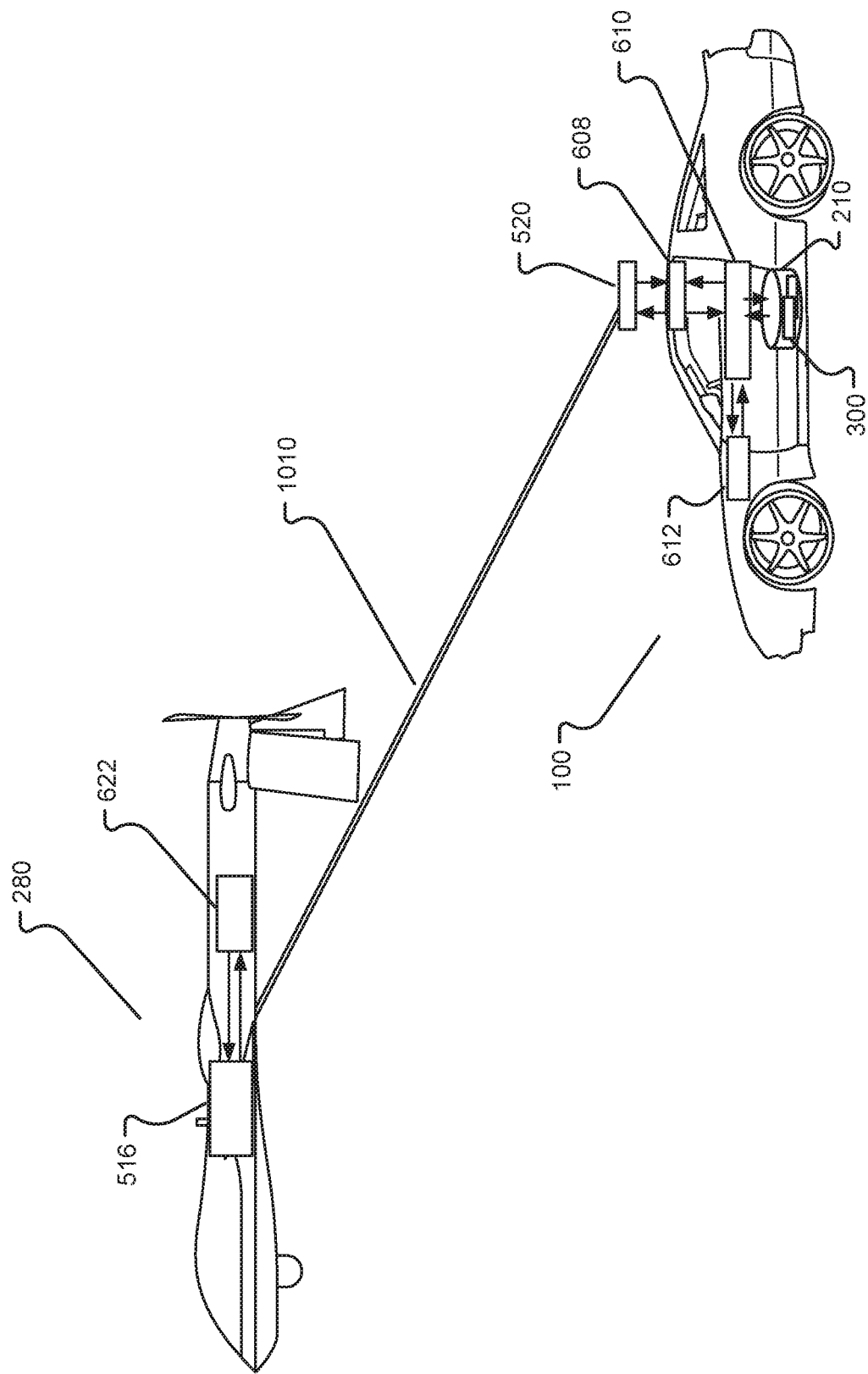
FIG. 10 shows a vehicle in an aerial vehicle charging environment in accordance with another embodiment of the present disclosure.

FIG. 10 shows a vehicle in an aerial vehicle charging environment in accordance with another embodiment of the present disclosure. Generally, this embodiment involves an aerial vehicle ("AV"), such as an Unmanned Aerial Vehicle (UAV), flying over or near a vehicle to provide a charge. The UAV may also land on the car to provide an emergency (or routine) charge. Such a charging scheme may be particularly suited for operations in remote areas, in high traffic situations, and/or when the car is moving. The AV may be a specially-designed UAV, aka RPV or drone, with a charging panel that can extend from the AV to provide a charge. The AV may include a battery pack and a charging circuit to deliver a charge to the vehicle. The AV may be a manned aerial vehicle, such as a piloted general aviation aircraft, such as a Cessna 172.

With reference to FIG. 10, an exemplar embodiment of a vehicle charging system 100 comprising a charge provider configured as an aerial vehicle 280, the aerial vehicle 280 comprising a power source 516 and charge provider controller 622. The AV may be semi-autonomous or fully autonomous. The AV may have a remote pilot/operator providing control inputs. The power source 516 is configured to provide a charge to a charging panel 608 of vehicle 100. The power source 516 is in communication with the charge provider controller 622. The aerial vehicle 280 provides a tether 1010 to deploy or extend charging plate 520 near to charging panel 608. The tether 1010 may comprise a chain, rope, rigid or semi-rigid tow bar or any means to position charging plate 520 near charging panel 608. For example, tether 1010 may be similar to a refueling probe used by airborne tanker aircraft when refueling another aircraft.

In one embodiment, the charging plate 520 is not in physical interconnection to AV 280, that is, there is no tether 1010. In this embodiment, the charging plate 520 is positioned and controlled by AV 280 by way of a controller on AV 280 or in communication with AV 280.

In one embodiment, the charging plate 520 position and/or characteristics (e.g. charging power level, flying separation distance, physical engagement on/off) are controlled by vehicle 100 and/or a user in or driver of vehicle 100.

Charge or power output of power source 516 is provided or transmitted to charger plate 620 by way of a charging cable or wire, which may be integral to tether 1010. In one embodiment, the charging cable is non-structural, that is, it provides zero or little structural support to the connection between AV 280 and charger plate 520.

Charging panel 608 of vehicle 100 receives power from charger plate 520. Charging panel 608 and charger plate 520 may be in direct physical contact (termed a "contact" charger configuration) or not in direct physical contact (termed a "flyer" charger configuration), but must be at or below a threshold (separation) distance to enable charging, such as by induction. Energy transfer or charging from the charger plate 520 to the charging panel 608 is inductive charging (i.e. use of an EM field to transfer energy between two objects). The charging panel 608 provides received power to energy storage unit 612 by way of charging panel controller 610. Charging panel controller 610 is in communication with vehicle database 210, vehicle database 210 comprising an AV charging data structure.

Charging panel 508 may be located anywhere on vehicle 100, to include, for example, the roof, side panel, trunk, hood, front or rear bumper and wheel hub of vehicle 100. Charging panel 608 is mounted on the roof of vehicle 100 in the embodiment of FIG. 10. In some embodiments, charging panel 608 may be deployable, i.e. may extend or deploy only when charging is needed. For example, charging panel 608 may typically reside flush with the roof of vehicle 100 and extend when required for charging. Similarly, charger plate 520 may, in one embodiment, not be connected to AV 280 by way of tether 1010 and may instead be mounted directly on the AV 280, to include, for example, the wing, empennage, undercarriage to include landing gear, and may be deployable or extendable when required. Tether 1010 may be configured to maneuver charging plate 520 to any position on vehicle 100 so as to enable charging. In one embodiment, the AV 280 may land on the vehicle 100 so as to enable charging through direct contact (i.e. the aforementioned contact charging configuration) between the charging plate 520 and the charging panel 608 of vehicle 100. Charging may occur while both AV 280 and vehicle 100 are moving, while both vehicle 100 and AV 280 are not moving (i.e., vehicle 100 is parked and AV 280 lands on top of vehicle 100), or while vehicle 100 is parked and AV 280 is hovering or circling above. Control of the charging and/or positioning of the charging plate 520 may be manual, automatic or semi-automatic; said control may be performed through a GUI engaged by driver or occupant of receiving vehicle 100 and/or driver or occupant of charging AV 280.

Figure 11:
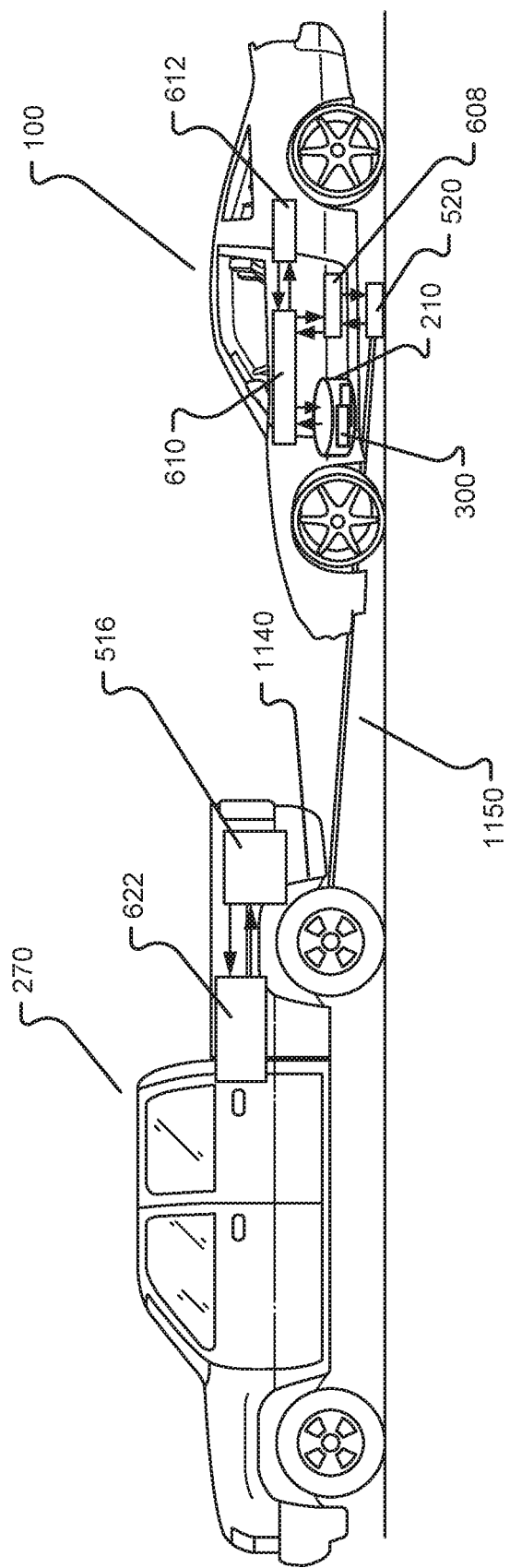
FIG. 11 shows a vehicle in an emergency charging environment in accordance with embodiments of the present disclosure.

FIG. 11 is an exemplar embodiment of a vehicle emergency charging system comprising an emergency charging vehicle 270 and charge receiver vehicle 100 is disclosed. The emergency charging vehicle 270 is a road vehicle, such as a pick-up truck, as shown in FIG. 11. The emergency charging vehicle 270 is configured to provide a charge to a charge receiver vehicle 100, such as an automobile. The emergency charging vehicle 270 comprises an energy source i.e. a charging power source 516 and a charge provider controller 622 in communication with the charging power source 516. The emergency charging vehicle 270 provides a towed and/or articulated charger plate 520, as connected to the emergency charging vehicle 270 by connector 1150. The connector 1150 may comprise a chain, rope, rigid or semi-rigid tow bar or any means to position charger plate 520 near the charging panel 608 of vehicle 100. Charge or power output of charging power source 516 is provided or transmitted to charger plate 520 by way of charging cable or wire 1140. In one embodiment, the charging cable 1140 is non-structural, that is, it provides little or no structural support to the connection between emergency charging vehicle 270 and charging panel 608. Charging panel 608 (of vehicle 100) receives power from charger plate 520. Charger plate 520 and charging panel 608 may be in direct physical contact or not in direct physical contact, but must be at or below a threshold separation distance to enable charging, such as by induction. Charger plate 520 may comprise wheels or rollers so as to roll along roadway surface. Charger plate 520 may also not contact the ground surface and instead be suspended above the ground; such a configuration may be termed a "flying" configuration. In the flying configuration, charger plate may form an aerodynamic surface to, for example, facilitate stability and control of the positioning of the charging plate 520. Energy transfer or charging from the charger plate 520 to the charge receiver panel 608 is through inductive charging (i.e. use of an EM field to transfer energy between two objects). The charging panel 608 provides received power to energy storage unit 612 directly or by way of charging panel controller 610. In one embodiment, the receipt and/or control of the energy provided via the charging panel 608 is provided by charging panel controller 610.

Charging panel controller 610 may be located anywhere on charge receiver vehicle 100, to include, for example, the roof, side panel, trunk, hood, front or rear bumper and wheel hub of charge receiver 100 vehicle. In some embodiments, charging panel 608 may be deployable, i.e. may extend or deploy only when charging is needed. For example, charging panel 608 may typically stow flush with the lower plane of vehicle 100 and extend when required for charging. Similarly, charger plate 520 may, in one embodiment, not be connected to the lower rear of the emergency charging vehicle 270 by way of connector 1150 and may instead be mounted on the emergency charging vehicle 270, to include, for example, the roof, side panel, trunk, hood, front or rear bumper and wheel hub of emergency charging vehicle 270. Connector 1150 may be configured to maneuver connector plate 520 to any position on emergency charging vehicle 270 so as to enable charging. Control of the charging and/or positioning of the charging plate may be manual, automatic or semi-automatic; said control may be performed through a GUI engaged by driver or occupant of receiving vehicle and/or driver or occupant of charging vehicle.

Figure 12:
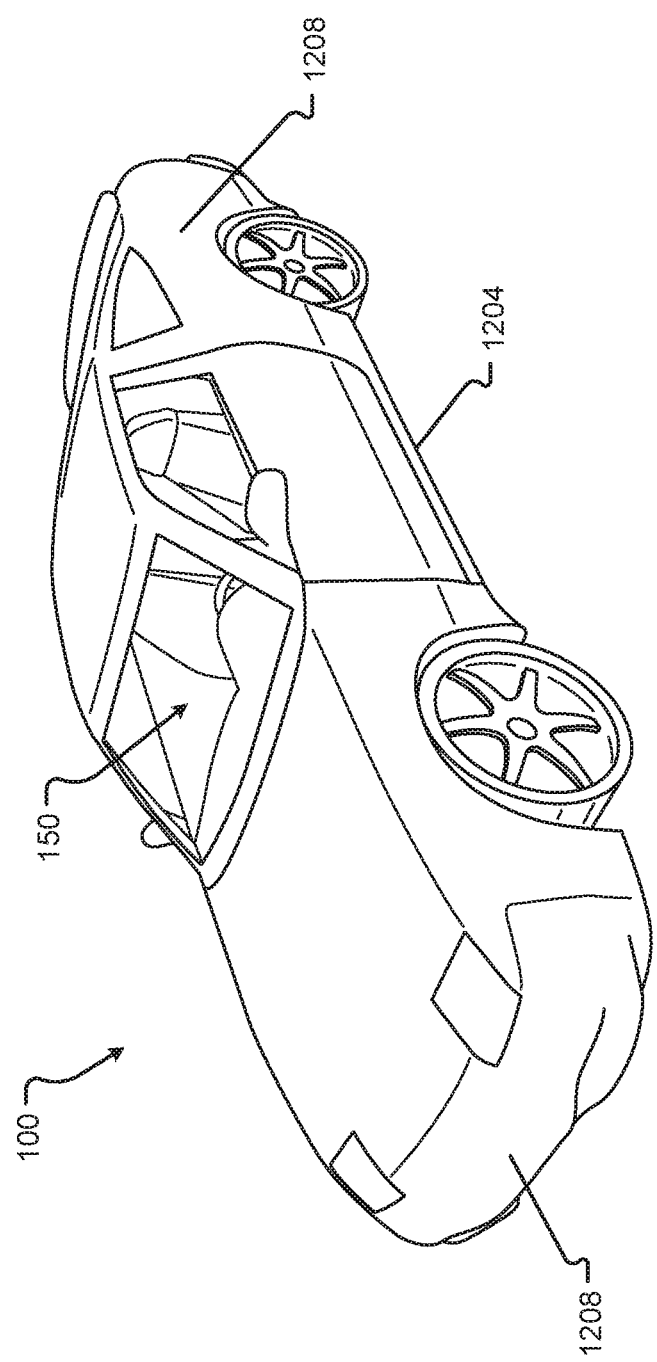
FIG. 12 is a perspective view of a vehicle in accordance with embodiments of the present disclosure.

FIG. 12 shows a perspective view of a vehicle 100 in accordance with embodiments of the present disclosure. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like. In any event, the vehicle 100 may include a frame 1204 and one or more body panels 1208 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components.

Figure 13:
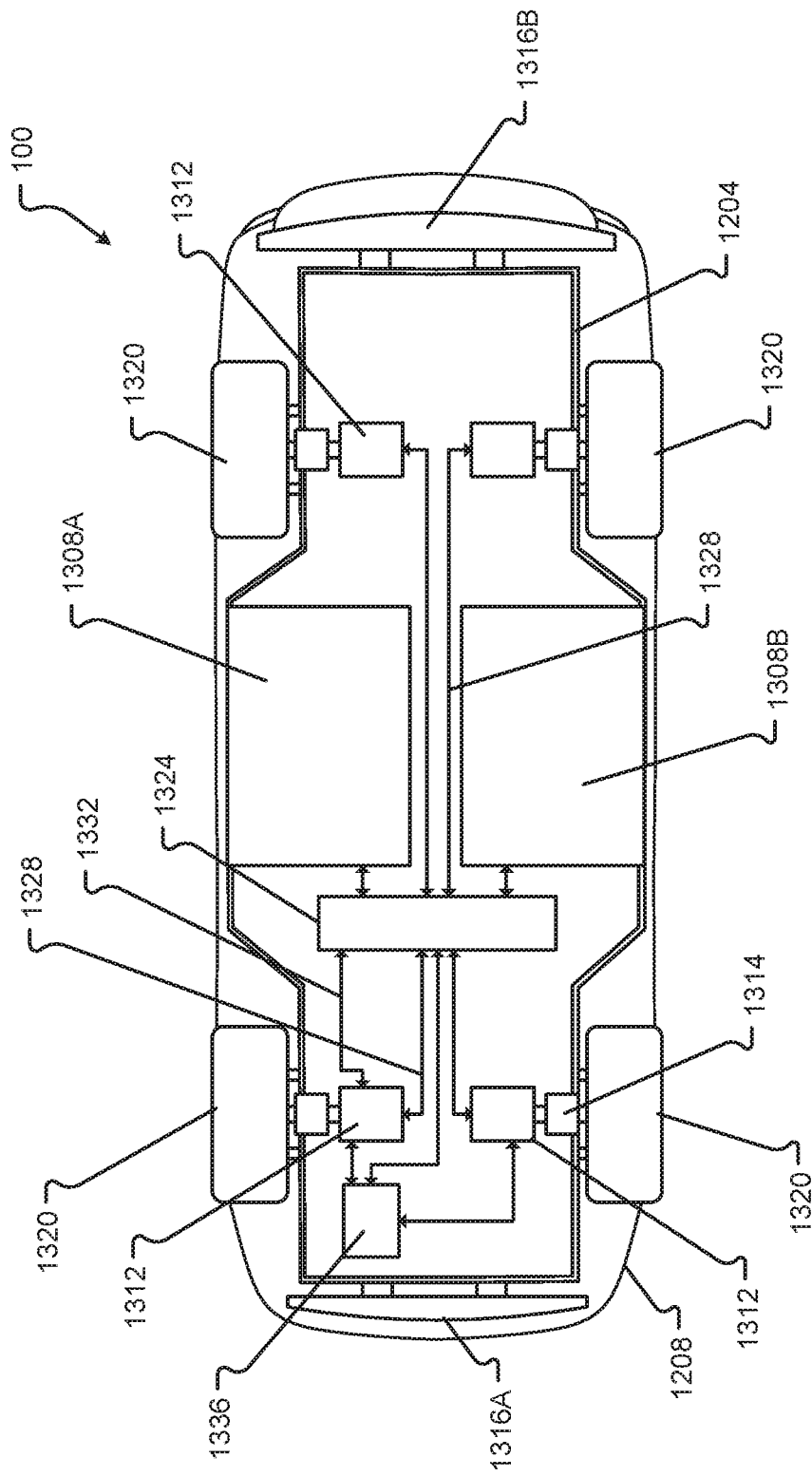
FIG. 13 is a plan view of a vehicle in accordance with at least some embodiments of the present disclosure.

Referring now to FIG. 13, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 1204 of the vehicle 100. The frame 1204 may comprise a separate frame and body construction (i.e., body-on-frame construction), a unitary frame and body construction (i.e., a unibody construction), or any other construction defining the structure of the vehicle 100. The frame 1204 may be made from one or more materials including, but in no way limited to steel, titanium, aluminum, carbon fiber, plastic, polymers, etc., and/or combinations thereof. In some embodiments, the frame 1204 may be formed, welded, fused, fastened, pressed, etc., combinations thereof, or otherwise shaped to define a physical structure and strength of the vehicle 100. In any event, the frame 1204 may comprise one or more surfaces, connections, protrusions, cavities, mounting points, tabs, slots, or other features that are configured to receive other components that make up the vehicle 100. For example, the body panels, powertrain subsystem, controls systems, interior components, communications subsystem, and safety subsystem may interconnect with, or attach to, the frame 1204 of the vehicle 100.

The frame 1204 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 1308A, 1308B, motors 1312, engines, safety equipment, controllers, user interfaces, interiors exterior components, body panels 1208, bumpers 1316, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single minute exchange principle. In some embodiments, the frame 1204 may include slides, receptacles, cavities, protrusions, and/or a number of other features that allow for quick exchange of system components. In one embodiment, the frame 1204 may include tray or ledge features, mechanical interconnection features, locking mechanisms, retaining mechanisms, etc., and/or combinations thereof. In some embodiments, it may be beneficial to quickly remove a used power source 1308A, 1308B (e.g., battery unit, capacitor unit, etc.) from the vehicle 100 and replace the used power source 1308A, 1308B with a charged power source. Continuing this example, the power source 1308A, 1308B may include selectively interchangeable features that interconnect with the frame 1204 or other portion of the vehicle 100. For instance, in a power source 1308A, 1308B replacement, the quick release features may be configured to release the power source 1308A, 1308B from an engaged position and slide or move away from the frame 1204 of a vehicle 100. Once removed, the power source 1308A, 1308B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 1204 with mechanisms and/or machines that are external or separate from the vehicle 100.

In some embodiments, the frame 1204 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 1204 and/or body of the vehicle 100. In some cases, the features may be built into the frame 1204 and/or body of the vehicle 100. In any event, the features may deploy from an unexposed position to an exposed position or may be configured to selectively engage/disengage without requiring an exposure or deployment of the mechanism from the frame 1204 and/or body. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 1312 of the vehicle 100. The electric motors 1312 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 1320 that are driven by the one or more electric motors 1312 and motor controllers 1314. In some cases, the vehicle 100 may include an electric motor 1312 configured to provide a driving force for each drive wheel 1320. In other cases, a single electric motor 1312 may be configured to share an output force between two or more drive wheels 1320 via one or more power transmission components. It is an aspect of the present disclosure that the powertrain include one or more power transmission components, motor controllers 1314, and/or power controllers that can provide a controlled output of power to one or more of the drive wheels 1320 of the vehicle 100. The power transmission components, power controllers, or motor controllers 1314 may be controlled by at least one other vehicle controller described herein.

As provided above, the powertrain of the vehicle 100 may include one or more power sources 1308A, 1308B. These one or more power sources 1308A, 1308B may be configured to provide drive power, system and/or subsystem power, accessory power, etc. While described herein as a single power source 1308 for sake of clarity, embodiments of the present disclosure are not so limited. For example, it should be appreciated that independent, different, or separate power sources 1308A, 1308B may provide power to various systems of the vehicle 100. For instance, a drive power source may be configured to provide the power for the one or more electric motors 1312 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 1308A, 1308B in this manner may provide a number of benefits over conventional vehicle systems. For example, separating the power sources 1308A, 1308B allow one power source 1308 to be removed and/or replaced independently without requiring that power be removed from all systems and/or subsystems of the vehicle 100 during a power source 1308 removal/replacement. For instance, one or more of the accessories, communications, safety equipment, and/or backup power systems, etc., may be maintained even when a particular power source 1308A, 1308B is depleted, removed, or becomes otherwise inoperable.

In some embodiments, the drive power source may be separated into two or more cells, units, sources, and/or systems. By way of example, a vehicle 100 may include a first drive power source 1308A and a second drive power source 1308B. The first drive power source 1308A may be operated independently from or in conjunction with the second drive power source 1308B and vice versa. Continuing this example, the first drive power source 1308A may be removed from a vehicle while a second drive power source 1308B can be maintained in the vehicle 100 to provide drive power. This approach allows the vehicle 100 to significantly reduce weight (e.g., of the first drive power source 1308A, etc.) and improve power consumption, even if only for a temporary period of time. In some cases, a vehicle 100 running low on power may automatically determine that pulling over to a rest area, emergency lane, and removing, or "dropping off," at least one power source 1308A, 1308B may reduce enough weight of the vehicle 100 to allow the vehicle 100 to navigate to the closest power source replacement and/or charging area. In some embodiments, the removed, or "dropped off," power source 1308A may be collected by a collection service, vehicle mechanic, tow truck, or even another vehicle or individual.

The power source 1308 may include a GPS or other geographical location system that may be configured to emit a location signal to one or more receiving entities. For instance, the signal may be broadcast or targeted to a specific receiving party. Additionally or alternatively, the power source 1308 may include a unique identifier that may be used to associate the power source 1308 with a particular vehicle 100 or vehicle user. This unique identifier may allow an efficient recovery of the power source 1308 dropped off. In some embodiments, the unique identifier may provide information for the particular vehicle 100 or vehicle user to be billed or charged with a cost of recovery for the power source 1308.

The power source 1308 may include a charge controller 1324 that may be configured to determine charge levels of the power source 1308, control a rate at which charge is drawn from the power source 1308, control a rate at which charge is added to the power source 1308, and/or monitor a health of the power source 1308 (e.g., one or more cells, portions, etc.). In some embodiments, the charge controller 1324 or the power source 1308 may include a communication interface. The communication interface can allow the charge controller 1324 to report a state of the power source 1308 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers of the vehicle 100 or a communication device that is separate and/or apart from the vehicle 100.

The powertrain includes one or more power distribution systems configured to transmit power from the power source 1308 to one or more electric motors 1312 in the vehicle 100. The power distribution system may include electrical interconnections 1328 in the form of cables, wires, traces, wireless power transmission systems, etc., and/or combinations thereof. It is an aspect of the present disclosure that the vehicle 100 include one or more redundant electrical interconnections 1332 of the power distribution system. The redundant electrical interconnections 1332 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 1332 is being used and/or damage has occurred to a particular area of the vehicle electrical system. In any event, the one or more redundant electrical interconnections 1332 may be configured along completely different routes than the electrical interconnections 1328 and/or include different modes of failure than the electrical interconnections 1328 to, among other things, prevent a total interruption power distribution in the event of a failure.

In some embodiments, the power distribution system may include an energy recovery system 1336. This energy recovery system 1336, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 1336, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 1308. For example, the recovered electrical energy may be used to charge the power source 1308 of the vehicle 100.

The vehicle 100 may include one or more safety systems. Vehicle safety systems can include a variety of mechanical and/or electrical components including, but in no way limited to, low impact or energy-absorbing bumpers 1316A, 1316B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 14:
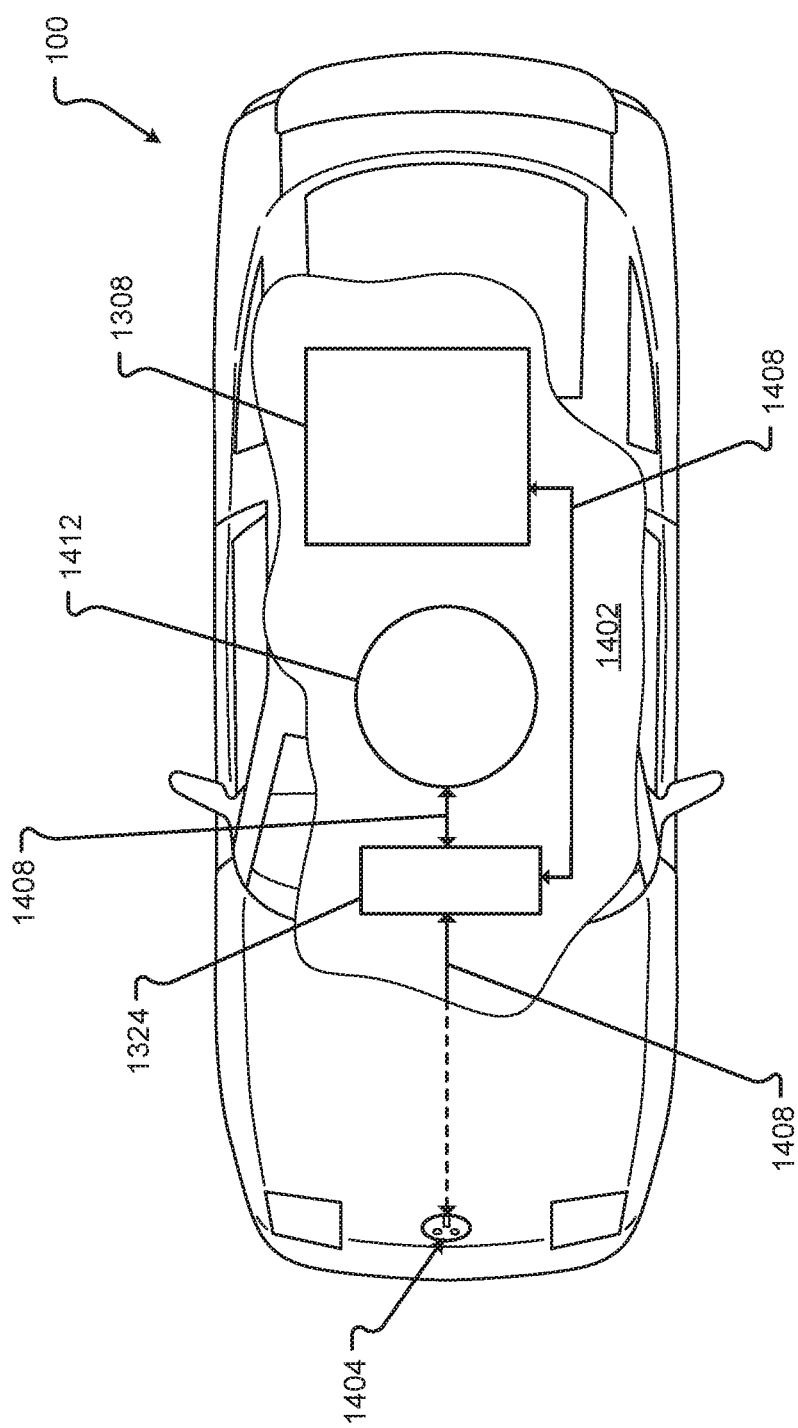
FIG. 14 is a plan view of a vehicle in accordance with embodiments of the present disclosure.

FIG. 14 shows a plan view of the vehicle 100 in accordance with embodiments of the present disclosure. In particular, FIG. 14 shows a broken section 1402 of a charging system for the vehicle 100. The charging system may include a plug or receptacle 1404 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 1404 may be transferred via at least one power transmission interconnection 1408. Similar, if not identical, to the electrical interconnections 1328 described above, the at least one power transmission interconnection 1408 may be one or more cables, wires, traces, wireless power transmission systems, etc., and/or combinations thereof. Electrical energy in the form of charge can be transferred from the external power source to the charge controller 1324. As provided above, the charge controller 1324 may regulate the addition of charge to the power source 1308 of the vehicle 100 (e.g., until the power source 1308 is full or at a capacity, etc.).

In some embodiments, the vehicle 100 may include an inductive charging system and inductive charger 1412. The inductive charger 1412 may be configured to receive electrical energy from an inductive power source external to the vehicle 100. In one embodiment, when the vehicle 100 and/or the inductive charger 1412 is positioned over an inductive power source external to the vehicle 100, electrical energy can be transferred from the inductive power source to the vehicle 100. For example, the inductive charger 1412 may receive the charge and transfer the charge via at least one power transmission interconnection 1408 to the charge controller 1324 and/or the power source 1308 of the vehicle 100. The inductive charger 1412 may be concealed in a portion of the vehicle 100 (e.g., at least partially protected by the frame 1204, one or more body panels 1208, a shroud, a shield, a protective cover, etc., and/or combinations thereof) and/or may be deployed from the vehicle 100. In some embodiments, the inductive charger 1412 may be configured to receive charge only when the inductive charger 1412 is deployed from the vehicle 100. In other embodiments, the inductive charger 1412 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 15:
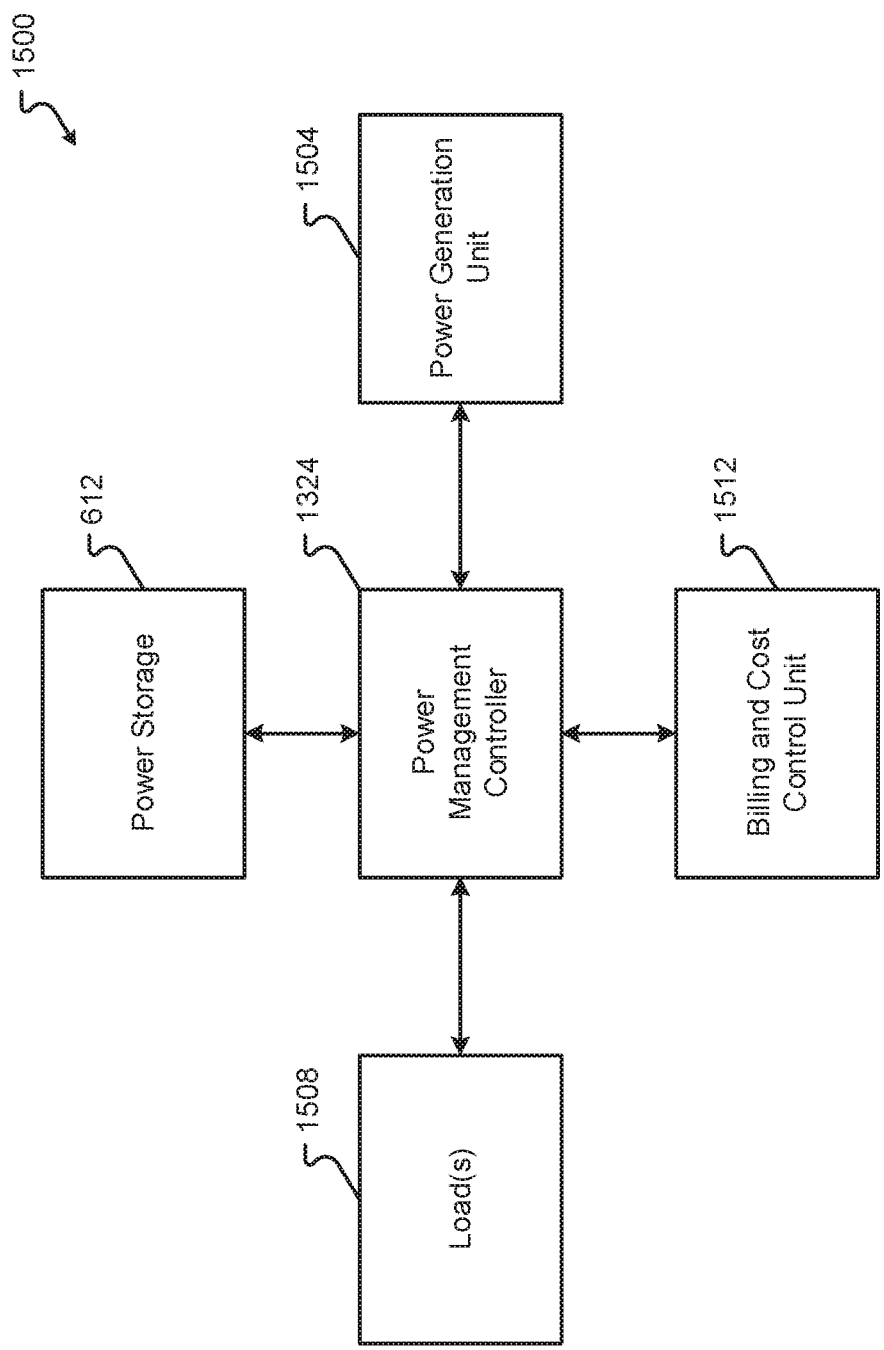
FIG. 15 is a block diagram of an embodiment of an electrical system of the vehicle.

An embodiment of the electrical system 1500 associated with the vehicle 100 may be as shown in FIG. 15. The electrical system 1500 can include power source(s) that generate power, power storage that stores power, and/or load(s) that consume power. Power sources may be associated with a power generation unit 1504. Power storage may be associated with a power storage system 612. Loads may be associated with loads 1508. The electrical system 1500 may be managed by a power management controller 1324. Further, the electrical system 1500 can include one or more other interfaces or controllers, which can include the billing and cost control unit 1512.

Figure 16:
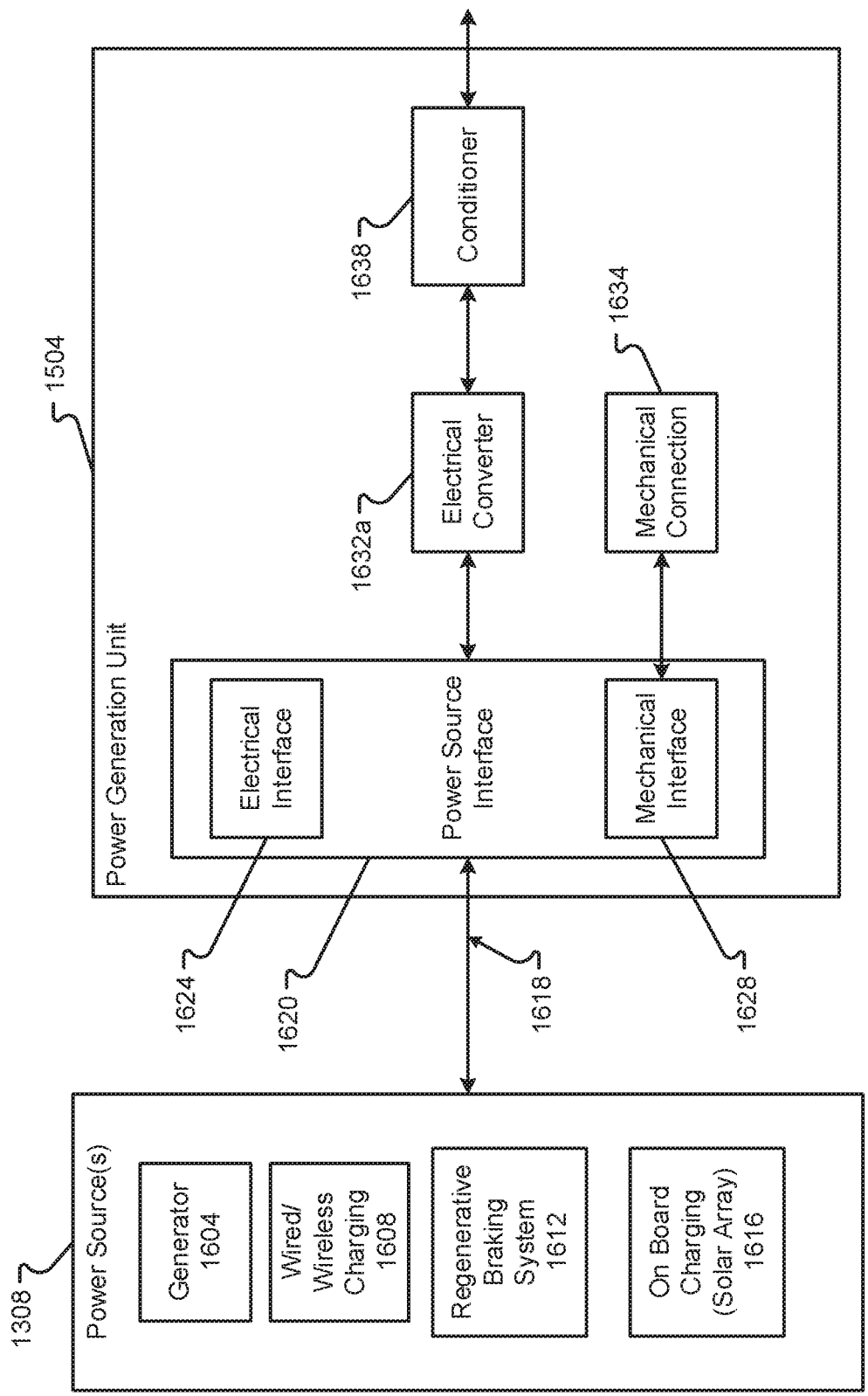
FIG. 16 is a block diagram of an embodiment of a power generation unit associated with the electrical system of the vehicle.

The power generation unit 1504 may be as described in conjunction with FIG. 16. The power storage component 612 may be as described in conjunction with FIG. 17. The loads 1508 may be as described in conjunction with FIG. 18.

The billing and cost control unit 1512 may interface with the power management controller 1324 to determine the amount of charge or power provided to the power storage 612 through the power generation unit 1504. The billing and cost control unit 1512 can then provide information for billing the vehicle owner. Thus, the billing and cost control unit 1512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 1324 can be a computer or computing system(s) and/or electrical system with associated components, as described herein, capable of managing the power generation unit 1504 to receive power, routing the power to the power storage 612, and then providing the power from either the power generation unit 1504 and/or the power storage 612 to the loads 1508. Thus, the power management controller 1324 may execute programming that controls switches, devices, components, etc. involved in the reception, storage, and provision of the power in the electrical system 1500.

An embodiment of the power generation unit 1504 may be as shown in FIG. 16. Generally, the power generation unit 1504 may be electrically coupled to one or more power sources 1308. The power sources 1308 can include power sources internal and/or associated with the vehicle 100 and/or power sources external to the vehicle 100 to which the vehicle 100 electrically connects. One of the internal power sources can include an on board generator 1604. The generator 1604 may be an alternating current (AC) generator, a direct current (DC) generator or a self-excited generator. The AC generators can include induction generators, linear electric generators, and/or other types of generators. The DC generators can include homopolar generators and/or other types of generators. The generator 1604 can be brushless or include brush contacts and generate the electric field with permanent magnets or through induction. The generator 1604 may be mechanically coupled to a source of kinetic energy, such as an axle or some other power take-off. The generator 1604 may also have another mechanical coupling to an exterior source of kinetic energy, for example, a wind turbine.

Another power source 1308 may include wired or wireless charging 1608. The wireless charging system 1608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include an connectors, wired interconnections, the controllers, etc. The wired and wireless charging systems 1608 can provide power to the power generation unit 1504 from external power sources 1308.

Internal sources for power may include a regenerative braking system 1612. The regenerative braking system 1612 can convert the kinetic energy of the moving car into electrical energy through a generation system mounted within the wheels, axle, and/or braking system of the vehicle 100. The regenerative braking system 1612 can include any coils, magnets, electrical interconnections, converters, controllers, etc. required to convert the kinetic energy into electrical energy.

Another source of power 1308, internal to or associated with the vehicle 100, may be a solar array 1616. The solar array 1616 may include any system or device of one or more solar cells mounted on the exterior of the vehicle 100 or integrated within the body panels of the vehicle 100 that provides or converts solar energy into electrical energy to provide to the power generation unit 1504.

The power sources 1308 may be connected to the power generation unit 1504 through an electrical interconnection 1618. The electrical interconnection 1618 can include any wire, interface, bus, etc. between the one or more power sources 1308 and the power generation unit 1504.

The power generation unit 1504 can also include a power source interface 1620. The power source interface 1620 can be any type of physical and/or electrical interface used to receive the electrical energy from the one or more power sources 1308; thus, the power source interface 1620 can include an electrical interface 1624 that receives the electrical energy and a mechanical interface 1628 which may include wires, connectors, or other types of devices or physical connections. The mechanical interface 1608 can also include a physical/electrical connection 1634 to the power generation unit 1504.

The electrical energy from the power source 1308 can be processed through the power source interface 1624 to an electric converter 1632. The electric converter 1632 may convert the characteristics of the power from one of the power sources into a useable form that may be used either by the power storage 612 or one or more loads 1508 within the vehicle 100. The electrical converter 1624 may include any electronics or electrical devices and/or component that can change electrical characteristics, e.g., AC frequency, amplitude, phase, etc. associated with the electrical energy provided by the power source 1308. The converted electrical energy may then be provided to an optional conditioner 1638. The conditioner 1638 may include any electronics or electrical devices and/or component that may further condition the converted electrical energy by removing harmonics, noise, etc. from the electrical energy to provide a more stable and effective form of power to the vehicle 100.

Figure 17:
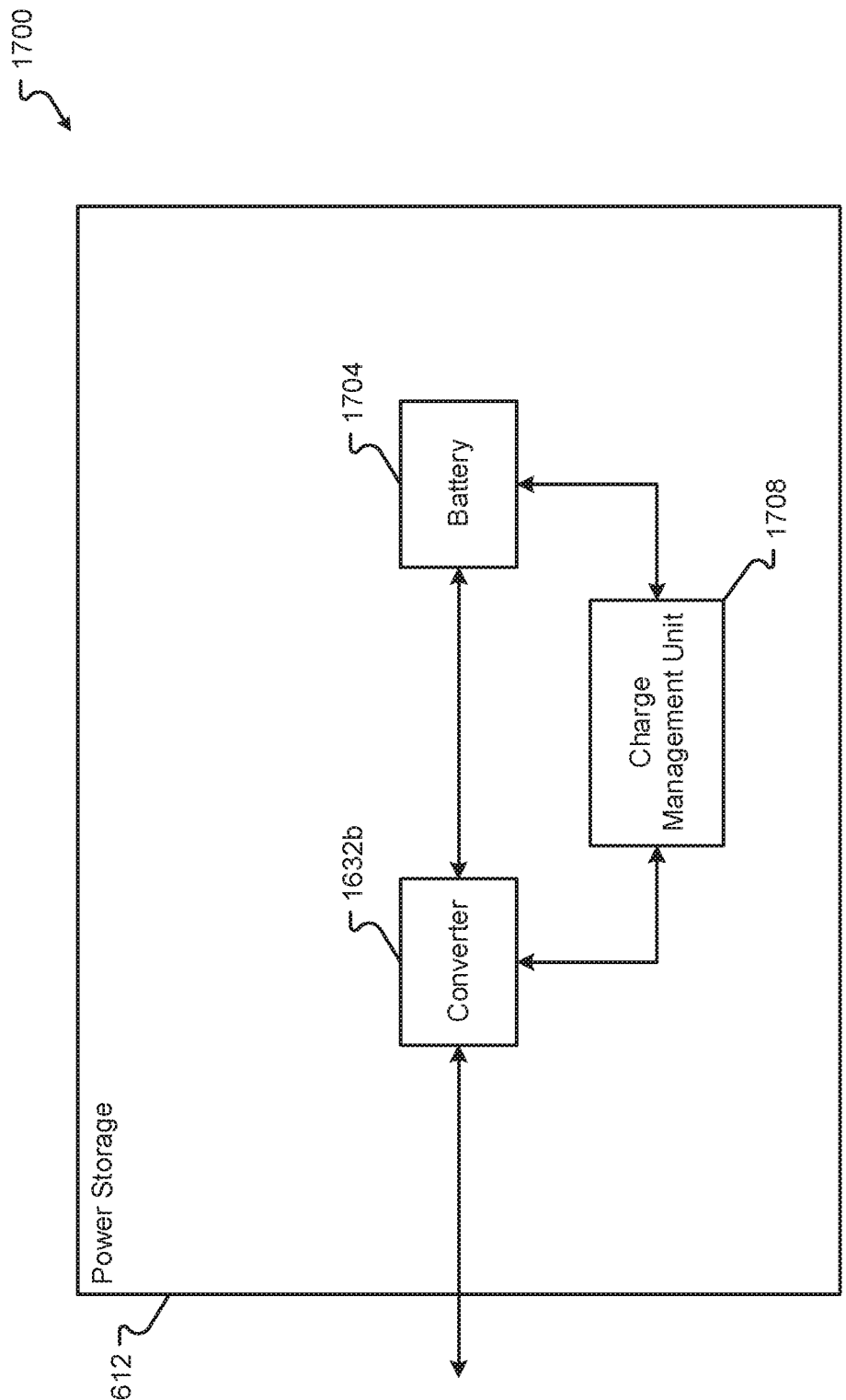
FIG. 17 is a block diagram of an embodiment of power storage associated with the electrical system of the vehicle.

An embodiment of the power storage 1612 may be as shown in FIG. 17. The power storage unit can include an electrical converter 1632b, one or more batteries, one or more rechargeable batteries, one or more capacitors, one or more accumulators, one or more supercapacitors, one or more ultrabatteries, and/or superconducting magnetics 1704, and/or a charge management unit 1708. The converter 1632b may be the same or similar to the electrical converter 1632a shown in FIG. 16. The converter 1632b may be a replacement for the electric converter 1632a shown in FIG. 16 and thus eliminate the need for the electrical converter 1632a as shown in FIG. 16. However, if the electrical converter 1632a is provided in the power generation unit 1504, the converter 1632b, as shown in the power storage unit 612, may be eliminated. The converter 1632b can also be redundant or different from the electrical converter 1632a shown in FIG. 16 and may provide a different form of energy to the battery and/or capacitors 1704. Thus, the converter 1632b can change the energy characteristics specifically for the battery/capacitor 1704.

The battery 1704 can be any type of battery for storing electrical energy, for example, a lithium ion battery, a lead acid battery, a nickel cadmium battery, etc. Further, the battery 1704 may include different types of power storage systems, such as, ionic fluids or other types of fuel cell systems. The energy storage 1704 may also include one or more high-capacity capacitors 1704. The capacitors 1704 may be used for long-term or short-term storage of electrical energy. The input into the battery or capacitor 1704 may be different from the output, and thus, the capacitor 1704 may be charged quickly but drain slowly. The functioning of the converter 1632 and battery capacitor 1704 may be monitored or managed by a charge management unit 1708.

The charge management unit 1708 can include any hardware (e.g., any electronics or electrical devices and/or components), software, or firmware operable to adjust the operations of the converter 1632 or batteries/capacitors 1704. The charge management unit 1708 can receive inputs or periodically monitor the converter 1632 and/or battery/capacitor 1704 from this information; the charge management unit 1708 may then adjust settings or inputs into the converter 1632 or battery/capacitor 1704 to control the operation of the power storage system 612.

Figure 18:
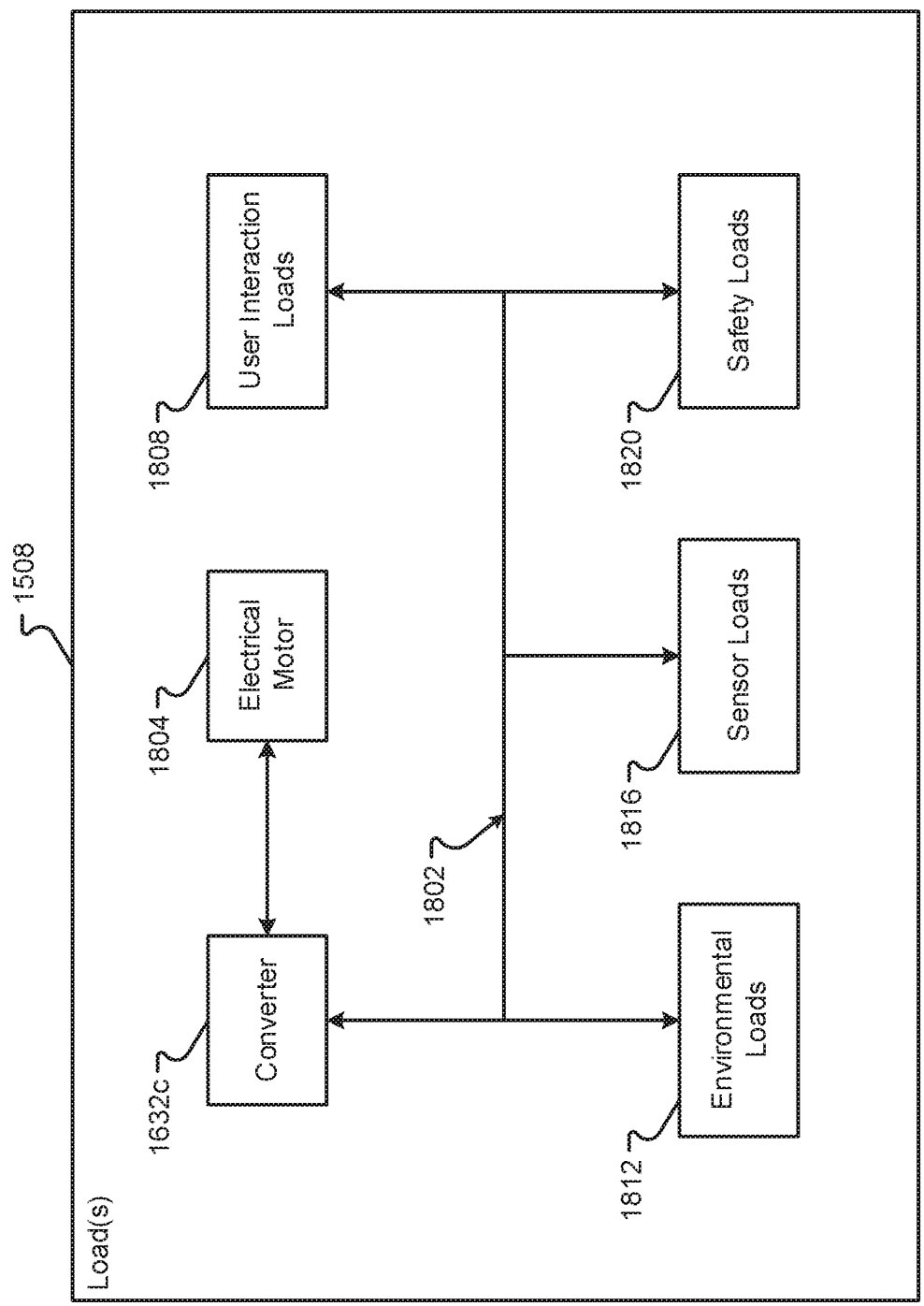
FIG. 18 is a block diagram of an embodiment of loads associated with the electrical system of the vehicle.

An embodiment of one or more loads 1508 associated with the vehicle 100 may be as shown in FIG. 18. The loads 1508 may include a bus or electrical interconnection system 1802, which provides electrical energy to one or more different loads within the vehicle 100. The bus 1802 can be any number of wires or interfaces used to connect the power generation unit 1504 and/or power storage 1612 to the one or more loads 1508. The converter 1632c may be an interface from the power generation unit 1504 or the power storage 612 into the loads 1508. The converter 1632c may be the same or similar to electric converter 1632a as shown in FIG. 16. Similar to the discussion of the converter 1632b in FIG. 17, the converter 1632c may be eliminated, if the electric converter 1632a, shown in FIG. 16, is present. However, the converter 1632c may further condition or change the energy characteristics for the bus 1802 for use by the loads 1508. The converter 1632c may also provide electrical energy to electric motor 1804, which may power the vehicle 100.

The electric motor 1804 can be any type of DC or AC electric motor. The electric motor may be a direct drive or induction motor using permanent magnets and/or winding either on the stator or rotor. The electric motor 1804 may also be wireless or include brush contacts. The electric motor 1804 may be capable of providing a torque and enough kinetic energy to move the vehicle 100 in traffic.

The different loads 1508 may also include environmental loads 1812, sensor loads 1816, safety loads 1820, user interaction loads 1808, etc. User interaction loads 1808 can be any energy used by user interfaces or systems that interact with the driver and/or passenger(s). These loads 1808 may include, for example, the heads up display, the dash display, the radio, user interfaces on the head unit, lights, radio, and/or other types of loads that provide or receive information from the occupants of the vehicle 100. The environmental loads 1812 can be any loads used to control the environment within the vehicle 100. For example, the air conditioning or heating unit of the vehicle 100 can be environmental loads 1812. Other environmental loads can include lights, fans, and/or defrosting units, etc. that may control the environment within the vehicle 100. The sensor loads 1816 can be any loads used by sensors, for example, air bag sensors, GPS, and other such sensors used to either manage or control the vehicle 100 and/or provide information or feedback to the vehicle occupants. The safety loads 1820 can include any safety equipment, for example, seat belt alarms, airbags, headlights, blinkers, etc. that may be used to manage the safety of the occupants. There may be more or fewer loads than those described herein, although they may not be shown in FIG. 18.

Figure 19:
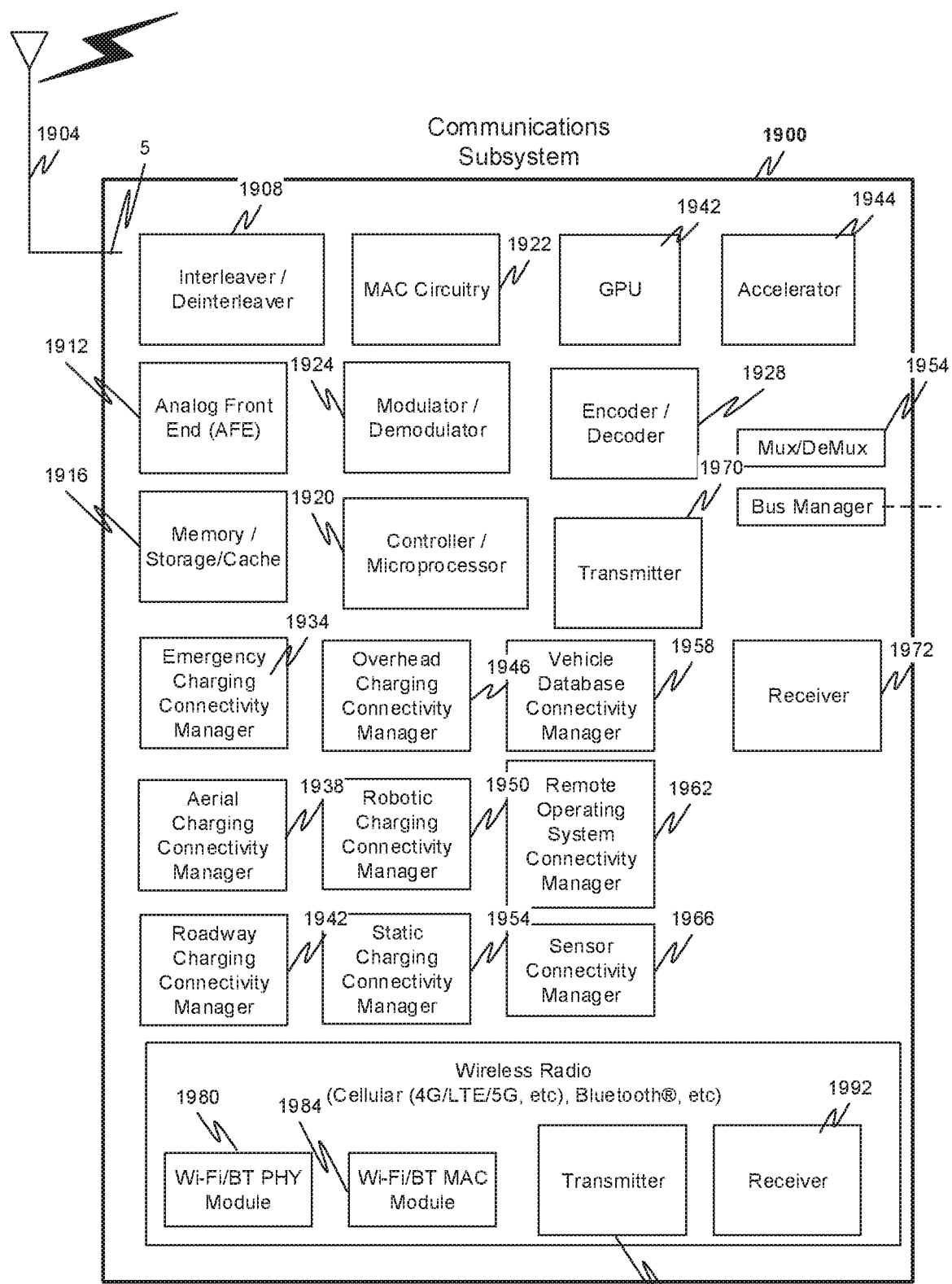
FIG. 19. is a block diagram of an exemplary embodiment of a communications subsystem of the vehicle.

FIG. 19 illustrates an exemplary hardware diagram of communications componentry that can be optionally associated with the vehicle.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud.

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager), including one or more of CANbus, OBD-II, ARCINC 429, Byteflight, CAN (Controller Area Network), D2B (Domestic Digital Bus), FlexRay, DC-BUS, IDB-1394, IEBus, I²C, ISO 9141-1/2, J1708, J1587, J1850, J1939, ISO 11783, Keyword Protocol 2000, LIN (Local Interconnect Network), MOST (Media Oriended Systems Transport), Multifunction Vehicle Bus, SMARTwireX, SPI, VAN (Vehicle Area Network), and the like or in general any communications protocol and/or standard.

The various protocols and communications can be communicated one or more of wirelessly and/or over transmission media such as single wire, twisted pair, fibre optic, IEEE 1394, MIL-STD-1553, MIL-STD-1773, power-line communication, or the like. (All of the above standards and protocols are incorporated herein by reference in their entirety)

As discussed, the communications subsystem enables communications between any if the inter-vehicle systems and subsystems as well as communications with non-collocated resources, such as those reachable over a network such as the Internet.

The communications subsystem, in addition to well-known componentry (which has been omitted for clarity), the device communications subsystem 1900 includes interconnected elements including one or more of: one or more antennas 1904, an interleaver/deinterleaver 1908, an analog front end (AFE) 1912, memory/storage/cache 1916, controller/microprocessor 1920, MAC circuitry 1922, modulator/demodulator 1924, encoder/decoder 1928, a plurality of connectivity managers 1934-1966, GPU 1942, accelerator 1944, a multiplexer/demultiplexer 1954, transmitter 1970, receiver 1972 and wireless radio 310 components such as a Wi-Fi PHY/Bluetooth® module 1980, a Wi-Fi/BT MAC module 1984, transmitter 1988 and receiver 1992. The various elements in the device 1900 are connected by one or more links/busses 5 (not shown, again for sake of clarity).

The device 400 can have one more antennas 1904, for use in wireless communications such as multi-input multi-output (MIMO) communications, multi-user multi-input multi-output (MU-MIMO) communications Bluetooth®, LTE, 4G, 5G, Near-Field Communication (NFC), etc. The antenna(s) 1904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle and/or in another vehicle.

Antenna(s) 1904 generally interact with the Analog Front End (AFE) 1912, which is needed to enable the correct processing of the received modulated signal and signal conditioning for a transmitted signal. The AFE 1912 can be functionally located between the antenna and a digital baseband system in order to convert the analog signal into a digital signal for processing and vice-versa.

The subsystem 1900 can also include a controller/microprocessor 1920 and a memory/storage/cache 1916. The subsystem 1900 can interact with the memory/storage/cache 1916 which may store information and operations necessary for configuring and transmitting or receiving the information described herein. The memory/storage/cache 1916 may also be used in connection with the execution of application programming or instructions by the controller/microprocessor 1920, and for temporary or long term storage of program instructions and/or data. As examples, the memory/storage/cache 1920 may comprise a computer-readable device, RAM, ROM, DRAM, SDRAM, and/or other storage device (s) and media.

The controller/microprocessor 1920 may comprise a general purpose programmable processor or controller for executing application programming or instructions related to the subsystem 1900. Furthermore, the controller/microprocessor 1920 can perform operations for configuring and transmitting/receiving information as described herein. The controller/microprocessor 1920 may include multiple processor cores, and/or implement multiple virtual processors. Optionally, the controller/microprocessor 1920 may include multiple physical processors. By way of example, the controller/microprocessor 1920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 1900 can further include a transmitter 1970 and receiver 1972 which can transmit and receive signals, respectively, to and from other devices, subsystems and/or other destinations using the one or more antennas 1904 and/or links/busses. Included in the subsystem 1900 circuitry is the medium access control or MAC Circuitry 1922. MAC circuitry 1922 provides for controlling access to the wireless medium. In an exemplary embodiment, the MAC circuitry 1922 may be arranged to contend for the wireless medium and configure frames or packets for communicating over the wireless medium.

The subsystem 1900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

The exemplary subsystem 1900 also includes a GPU 1942, an accelerator 1944, a Wi-Fi/BT/BLE PHY module 1980 and a Wi-Fi/BT/BLE MAC module 1984 and wireless transmitter 1988 and receiver 1992.

The various connectivity managers 1934-1966 manage and/or coordinate communications between the subsystem 1900 and one or more of the systems disclosed herein and one or more other devices/systems. The connectivity managers include an emergency charging connectivity manager 1934, an aerial charging connectivity manager 1938, a roadway charging connectivity manager 1942, an overhead charging connectivity manager 1946, a robotic charging connectivity manager 1950, a static charging connectivity manager 1954, a vehicle database connectivity manager 1958, a remote operating system connectivity manager 1962 and a sensor connectivity manager 1966.

The emergency charging connectivity manager 1934 can coordinate not only the physical connectivity between the vehicle and the emergency charging device/vehicle, but can also communicate with one or more of the power management controller, one or more third parties and optionally a billing system(s). As an example, the vehicle can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 1934 can also communicate information, such as billing information to the emergency charging vehicle and/or a third party. This billing information could be, for example, the owner of the vehicle, the driver of the vehicle, company information, or in general any information usable to charge the appropriate entity for the power received.

The aerial charging connectivity manager 1938 can coordinate not only the physical connectivity between the vehicle and the aerial charging device/vehicle, but can also communicate with one or more of the power management controller, one or more third parties and optionally a billing system(s). As an example, the vehicle can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 1938 can similarly communicate information, such as billing information to the aerial charging vehicle and/or a third party. This billing information could be, for example, the owner of the vehicle, the driver of the vehicle, company information, or in general any information usable to charge the appropriate entity for the power received etc., as discussed.

The roadway charging connectivity manager 1942 and overhead charging connectivity manager 1946 can coordinate not only the physical connectivity between the vehicle and the charging device/system, but can also communicate with one or more of the power management controller, one or more third parties and optionally a billing system(s). As one example, the vehicle can request a charge from the charging system when, for example, the vehicle needs or is predicted to need power. As an example, the vehicle can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle, the driver of the vehicle, company information, or in general any information usable to charge the appropriate entity for the power received etc., as discussed. The person responsible for paying for the charge could also receive a copy of the billing information as is customary. The robotic charging connectivity manager 1950 and static charging connectivity manager 1954 can operate in a similar manner to that described herein.

The vehicle database connectivity manager 1958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app on a mobile device the driver uses to track information about the vehicle and/or a dealer or service/maintenance provider. In general any information stored in the vehicle database can optionally be shared with any one or more other devices optionally subject to any privacy or confidentially restrictions.

The remote operating system connectivity manager 1962 facilitates communications between the vehicle and any one or more autonomous vehicle systems. These communications can include one or more of navigation information, vehicle information, occupant information, or in general any information related to the remote operation of the vehicle.

The sensor connectivity manager 1966 facilitates communications between any one or more of the vehicle sensors and any one or more of the other vehicle systems. The sensor connectivity manager 1966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS. The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

A system and method for vehicle to vehicle charging is disclosed in FIGS. 20-23. Generally, the system enables a charging vehicle to provide a charge to a receiving vehicle.

Figure 20:
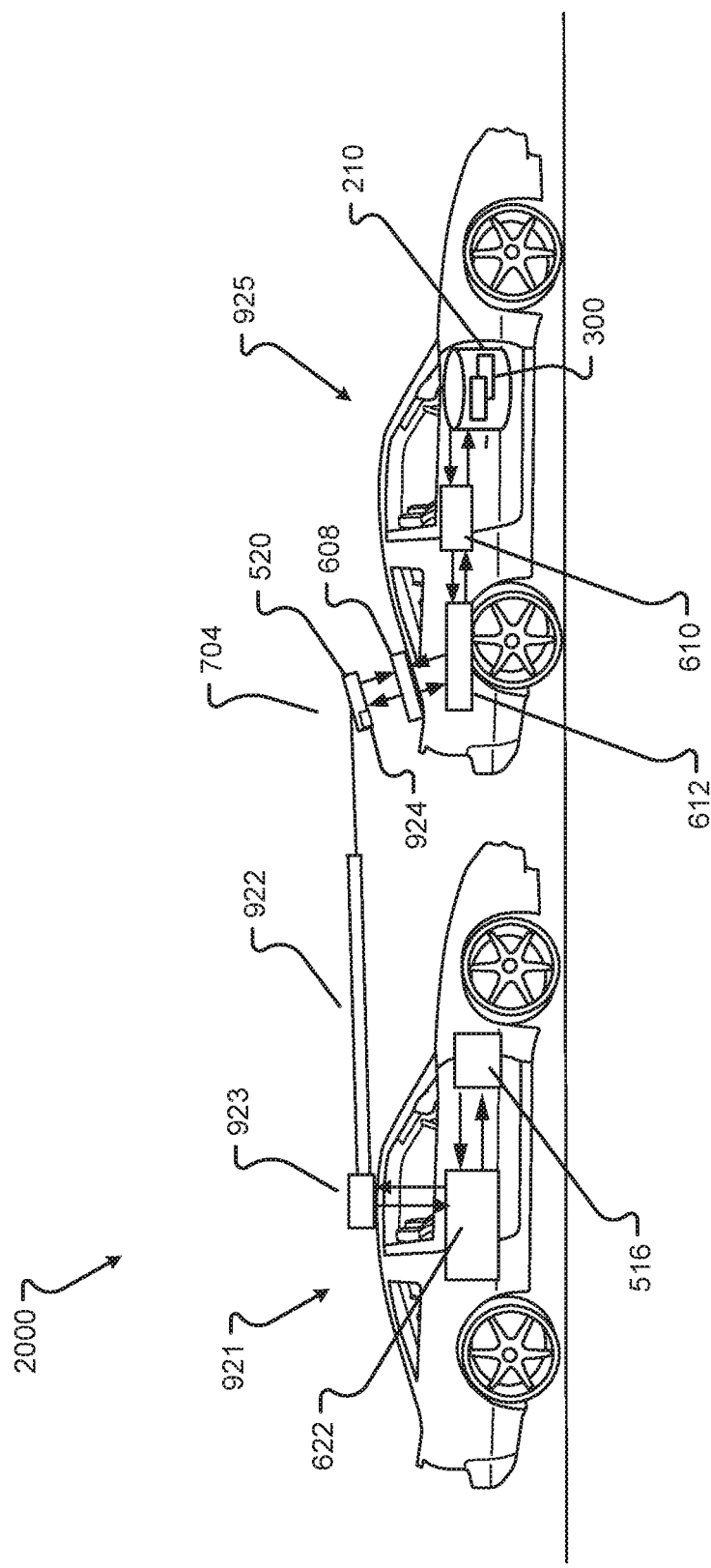
FIG. 20 shows a vehicle in a vehicle to vehicle roadway charging environment in accordance with embodiments of the present disclosure.

With attention to FIG. 20, one embodiment of a vehicle to vehicle charging system 2000 is depicted. The system 2000 comprises a charging vehicle 921 and a receiving vehicle 925. The charging vehicle 921 comprises power source 516 interconnected with a charge provider controller 622, the controller 622 interconnected with a charging vehicle controller 923. The charging vehicle controller 923 is interconnected with a charging vehicle arm 922 which in turn is interconnected with charging plate 520. The controller 923 may control one or more of the extension and/or positioning of the arm 922 and the positioning (relative to the distal end of arm and/or panel 608) of the plate 924. The charging vehicle arm 922 is extendable and extends so as to enable the charging plate 520 to charge (e.g. through induction) the receiving vehicle 925 by way of charging panel 608. The charging plate 520 may be disposed at a distal end of the charging vehicle arm 922. The charging plate 520 may comprise at least one positioning sensor 924, to enable automated positioning control of the charging plate 520 with respect to the charging panel 608 (further described with regard to FIG. 21). Receiving vehicle 925 comprises components as described in FIG. 7.

Figure 21:
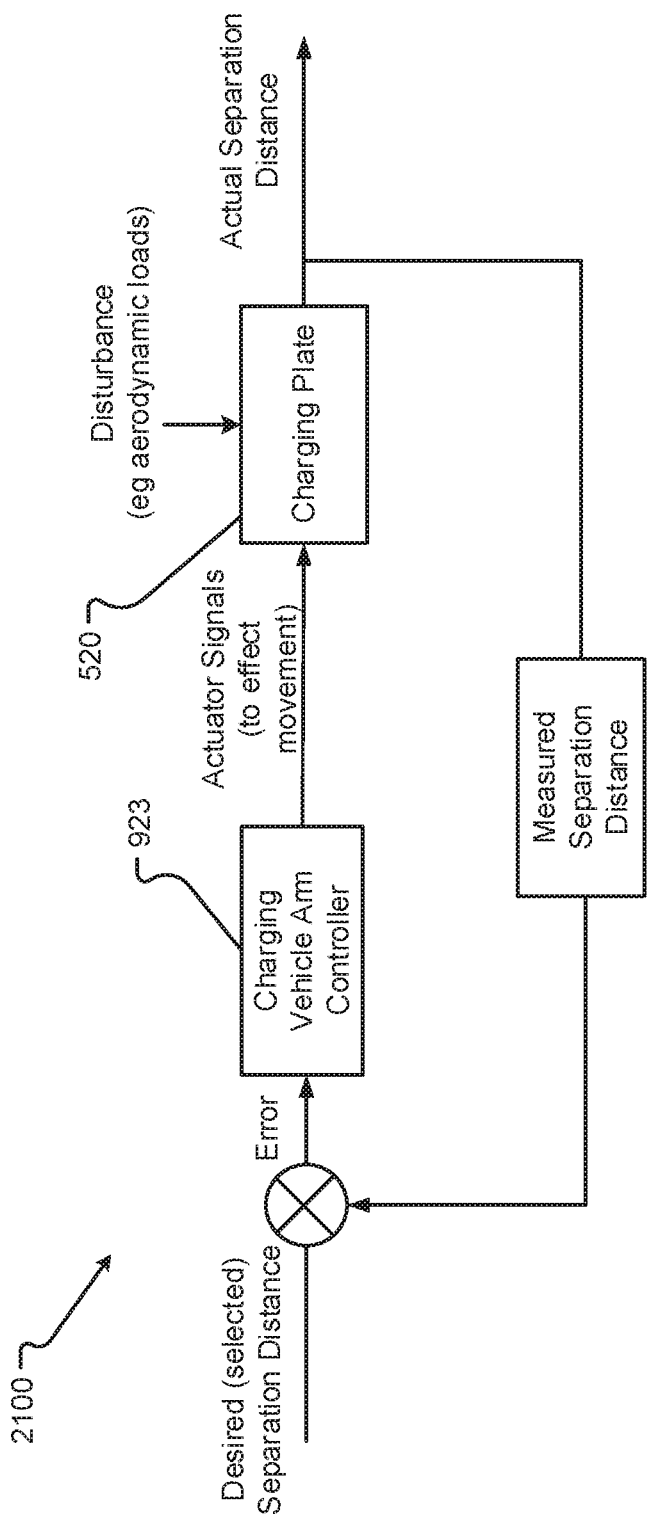
FIG. 21 is a block diagram of a charging panel control system.

FIG. 21 is a block diagram of a vehicle to vehicle control system 2100 which automatically positions the charging plate 520 with respect to the charging panel 608. Generally, the control system 2100 is a feedback control system to control the separation distance between the charging panel 608 and the charging plate 520. Selected separation distance is input (as determined by way of query to database 210 or manually entered by user) and compared with a measured separation distance (as from a separation distance sensor 924) to compute an error signal. The error signal is received by the controller 923 to determine control inputs to arm 922 (or to an actuator which maneuvers arm 922) which in turn positions the charging plate 52 relative to panel 608. Alternatively or additionally, the control 923 may control the maneuvering/positioning of plate 520 with respect to the distal end of arm 922. The error signal will typically be non-zero due to disturbances to the charging plate, such as aerodynamic loads generated while the vehicles are in motion. The controller 923 may employ any known types of feedback control known to those skilled in the art, comprising stochastic control, proportional, integral and/or derivative control, non-linear control and deterministic control. In other embodiments, a plurality of sensor 924 inputs are provided and/or a plurality of separation distances and/or loading measures are controlled. For example, a pair of positional sensors may be positioned at ends of a leading edge of an airfoil (or otherwise aerodynamically-shaped) charging plate 520 whereby pitch and/or roll are controlled as well as distance from the charging panel 608. Furthermore, a loading sensor may be positioned on the arm 922 and/or charging plate 520 to measure the loading imparted to the arm 922 and/or charging plate 520, so as to provide an ability to, for example, determine if a threshold value for do-not-exceed loading (as stored in database 210) has been exceeded.

Figure 22A:
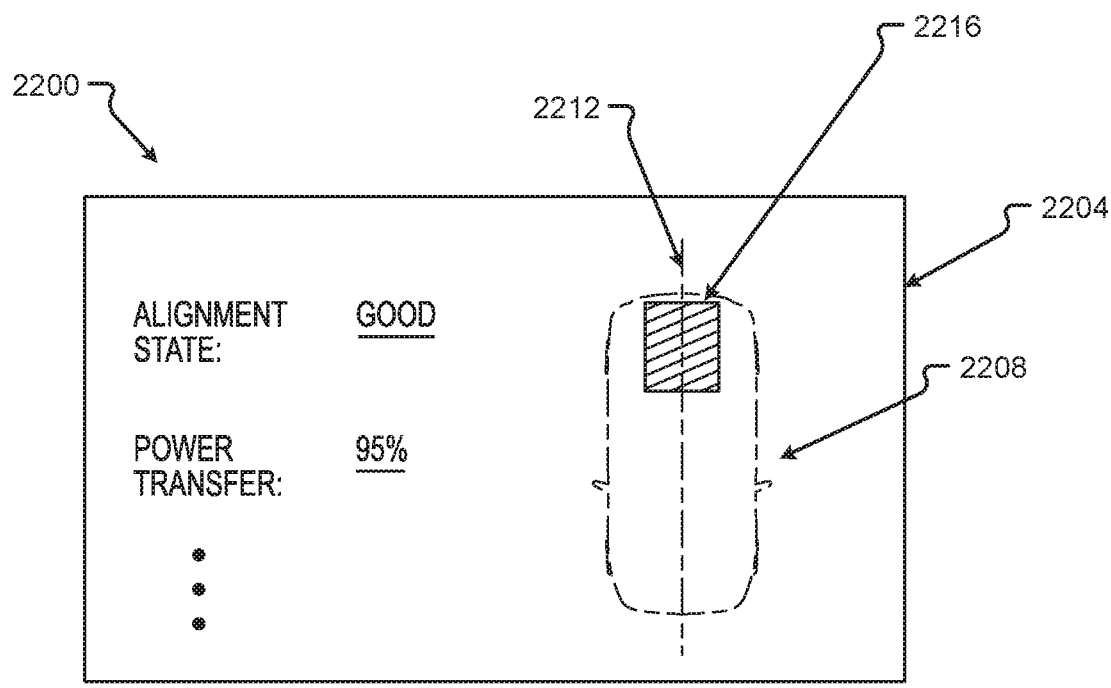
FIG. 22A shows a first state of a graphical user interface used in aligning a charging panel of an electrical vehicle to receive a charge.
Figure 22B:
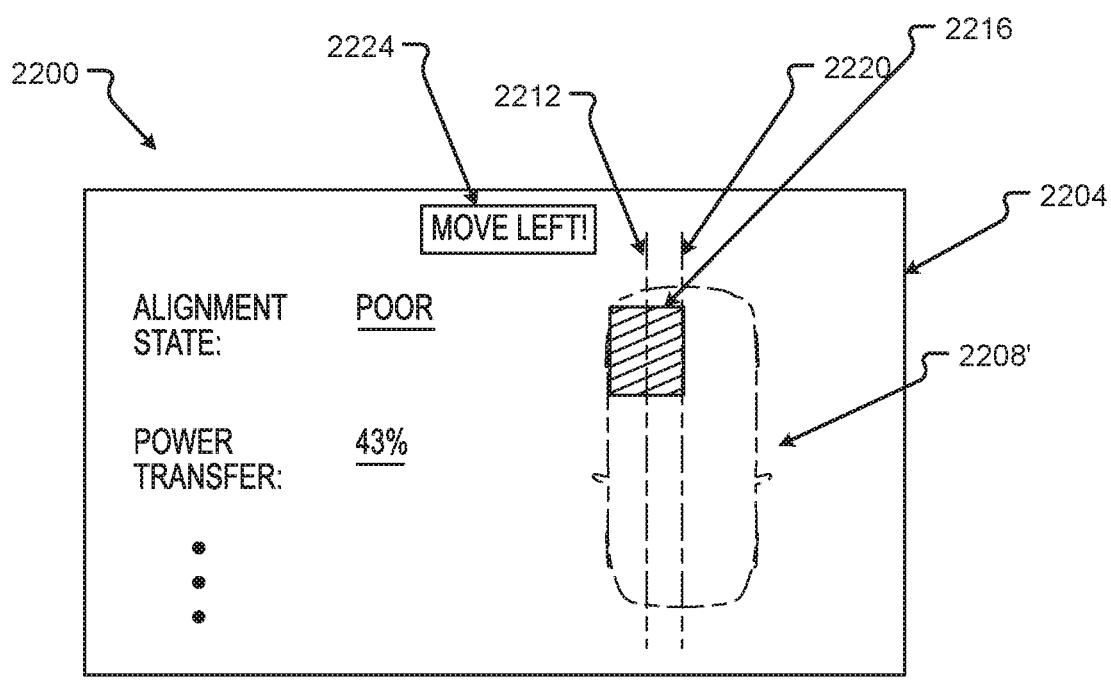
FIG. 22B shows a second state of the graphical user interface of FIG. 22A.

FIGS. 22A-B show representative states of a graphical user interface (GUI) used in aligning a charging plate 520 of a charging vehicle to provide a charge to a receiving vehicle (note: such a display could also be used by a receiving vehicle to position its charging panel 608 to receive a charge from a charging plate 520). More specifically, FIGS. 22A-B depict graphical user interfaces 2200 displaying feedback adjustment image one 2208 and feedback adjustment image two 2208' in accordance with embodiments of the present disclosure. In some embodiments, methods and systems are described that provide a charging vehicle 921, or a receiving vehicle 925, with the ability to properly align a charging plate or a charging panel relative to the other, respectively. The dynamic position or location may be provided to a driver (or any occupant of a vehicle) of the vehicle via at least one graphical user interface (GUI) 2200 of a display device 2204 to allow the driver to make any adjustments to the position of the charging vehicle 921, a receiving vehicle 925, charging plate 520 and/or the charging panel 608. For instance, the GUI 2200 may show a vehicle image aka feedback adjustment image 2008 relative to an alignment line, or centerline aka power source centerline icon 2212, of an image representing a charging element aka power source icon 2216. As the position of the charging plate 520, or charging vehicle 921, changes relative to the charging circuit components 2216 the graphical output (e.g., showing the relative position of the components in the charging system, etc.) provided to the at least one GUI 2200 changes (e.g., a changed representative image 2208', of the charging vehicle 921 may move relative to the centerline 2212 and/or image representing the charging element aka power source icon 2216, or vice versa, etc.) to reflect the changed position. This continual updating of the GUI 2200 and the relative charging components position can provide a driver of the vehicle with a feedback loop by which the driver can adjust a position of the charging panel 608, charging plate 520 and/or the vehicle 100 to obtain an optimal charging alignment between the charging plate and the at least one charging circuit component 2216. In some embodiments, a feedback recommendation aka alignment instruction 2224 may be displayed to a portion of the GUI 2200. For example, the feedback recommendation 2224 may provide the driver with alignment instructions and/or advice for adjusting a position of the vehicle relative to the charging circuit 2216.

In some embodiments, alignment instructions may comprise more than a horizontal separation distance adjustments, e.g. both a horizontal and a vertical alignment or position instructions, or a horizontal alignment instruction and an angular position. The angular alignment adjustment may comprise a yaw alignment command, which may be particularly important if the vehicle is moving and the power sources are multiple sequential power sources embedded in a roadway.

Figure 23:
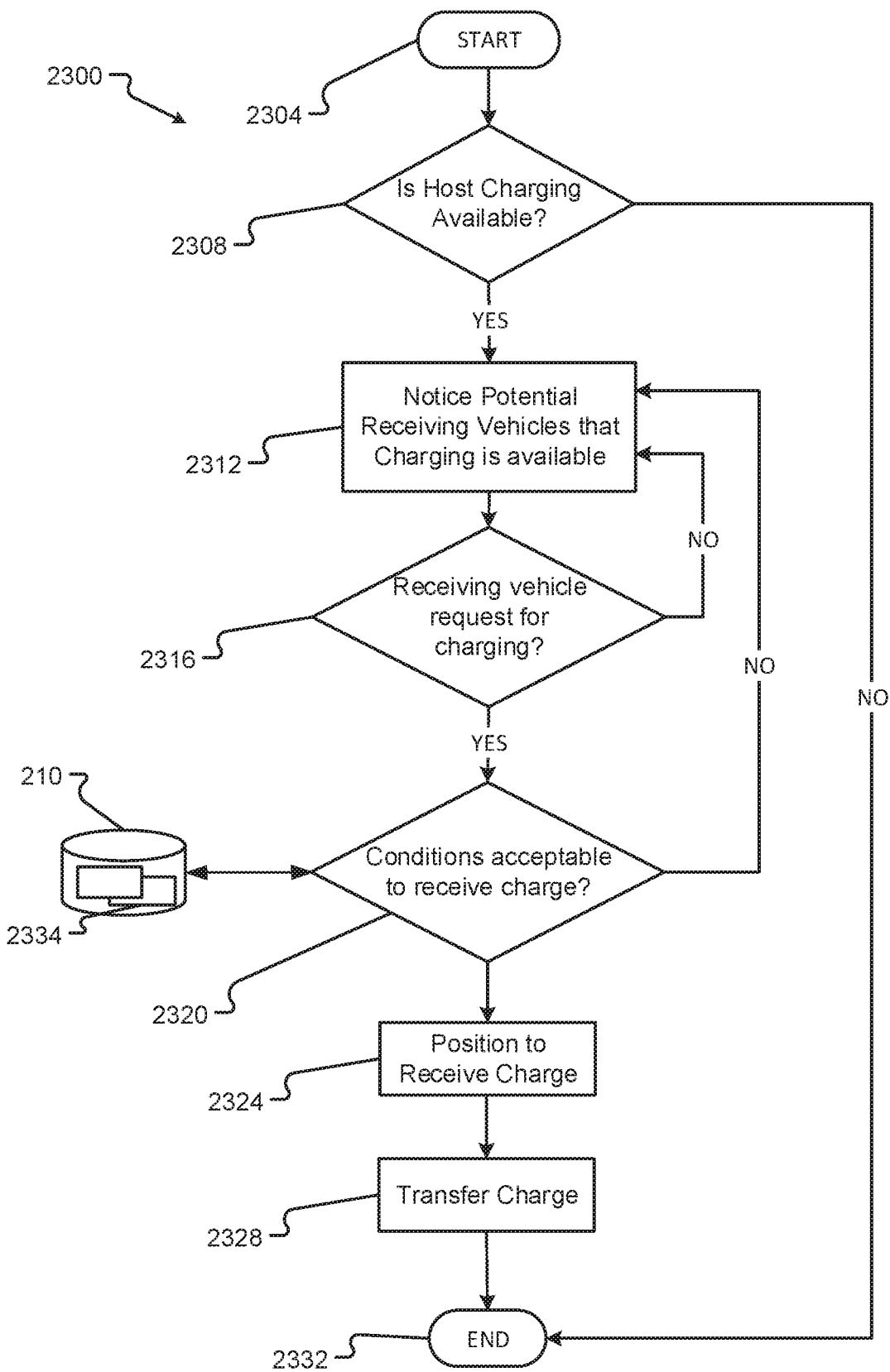
FIG. 23 is a flow or process diagram of a method of vehicle to vehicle charging.

FIG. 23 is a flow or process diagram of a method of vehicle to vehicle charging. The method starts at step 2304 and ends at step 2332.

After starting at step 2304, at step 2308 the method queries as to whether charging is available by charging vehicle 921. That is, a query is made as to whether the charging vehicle 921 is able to provide a charging service to a charging panel 608 of receiving vehicle 925. If NO, the method proceeds to step 2332 and ends. (Alternatively, the charging vehicle 921 may return to a home base station or similar and recharge its energy source i.e. recharge energy power unit 516.) If the result of the query of step 2308 is YES, the method proceeds to step 2312 wherein notice is provided that charging is available. The notice may comprise targeted communications e.g. by texting to potential receiving vehicle 925 within a selectable distance. The content of the notice may comprise: the availability of charging, and terms and conditions of charging (cost, payment types, amount available, duration of charging time, etc). The notice may comprise a physical mounted advertisement (eg a lighted sign on charging vehicle 921) that charging is available, not unlike a taxi "off duty" or "on duty" light. The notice may be through wireless advertisement, e.g. via a smartphone app available to potential receiving vehicles 925.

At step 2216 a query is made as to whether a particular receiving vehicle 925 has requested or requires or seeks a charge. Note that controller 923 may monitor a state or status of charging (e.g. battery is charged at 32%, or battery charging level drops below a selectable threshold value e.g. below 10%) of the energy storage unit 516 of charging vehicle 921 to determine if charging is recommended or required. A user, such as a driver or passenger, may also request that the vehicle be charged. If NO, the method proceeds back to step 2312. If YES, the method proceeds to step 2320.

At step 2320, a query is made as to whether the receiving vehicle 925 is configured to receive the charging from charging vehicle 921. Such a query may be facilitated by communications between vehicle "smart" control systems aboard one or both of charging vehicle 921 and charging vehicle 921, comprising communications between controller 923 and controller 610. Note that incompatibilities may include min/max energy transfer thresholds (e.g. voltages), electrical or mechanical incompatibilities charging plate 520 and panel 608, and physical incompatibilities between the vehicles 921 and 925 (e.g. such as exceeding range thresholds of arm 922). If the query answer is a NO, the method proceeds to step 2312. If YES, the method proceeds to step 2324 wherein the receiving vehicle 925 is charged by charging vehicle 921 and the method proceeds to step 2324 wherein the charging plate 520 is positioned with respect to the panel 608 so as to receive (or transmit) a charge. The positioning of the charging panel 520 and/or arm 922 may comprise selection of initial or nominal positioning via data contained in vehicle database 210 through a vehicle to vehicle charging system data structure 2334 (similar to that of FIG. 3. The method 2300 then continues to step 2328 wherein a charge is provided by plate 520 to panel 608 so as to power or charge energy source 612 of receiving vehicle 925. When charging is complete the method 2300 ends at step 2332.

Figure 24:
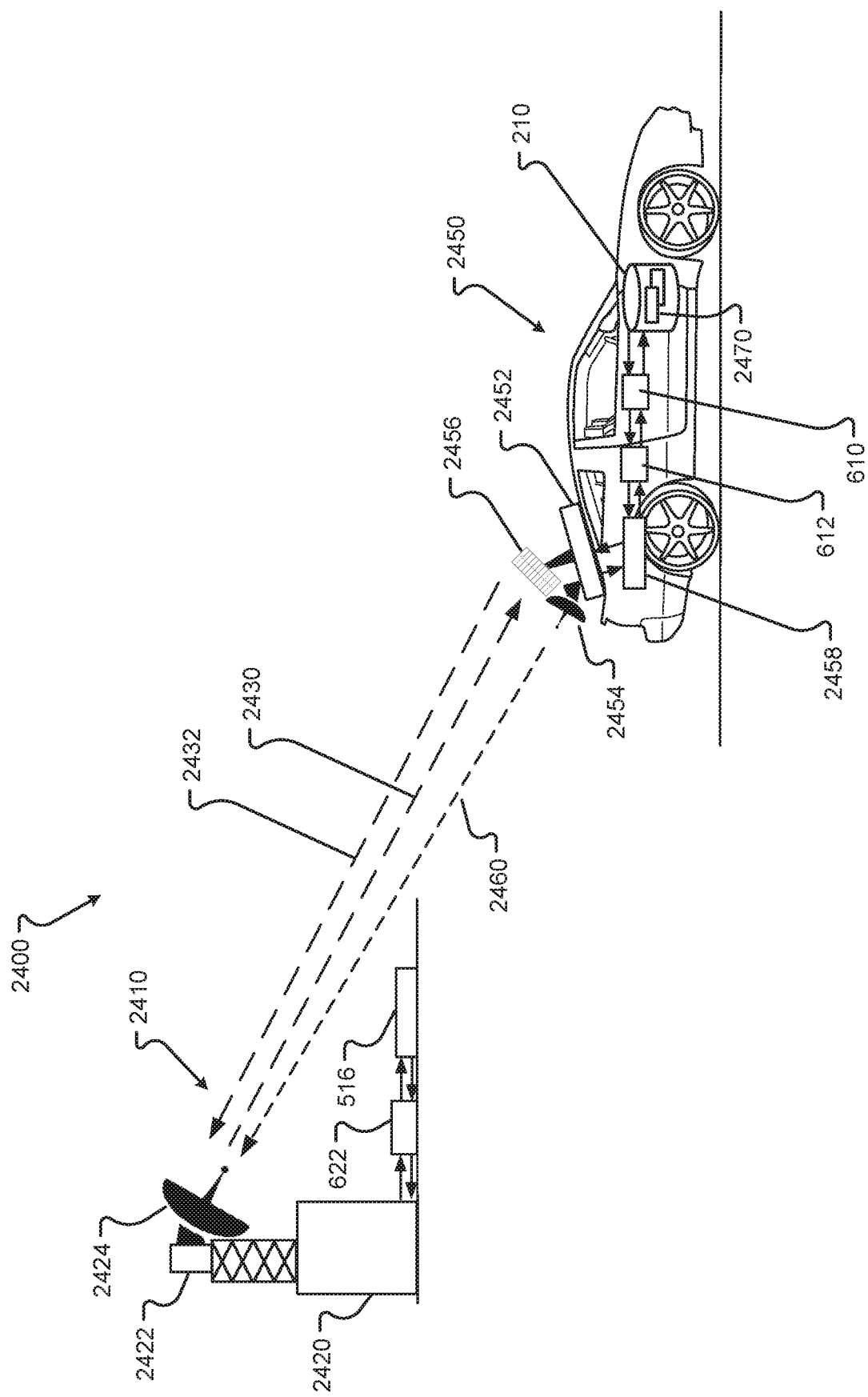
FIG. 24 shows a vehicle and optical charging station in an optical charging environment in accordance with embodiments of the present disclosure.
Figure 25:
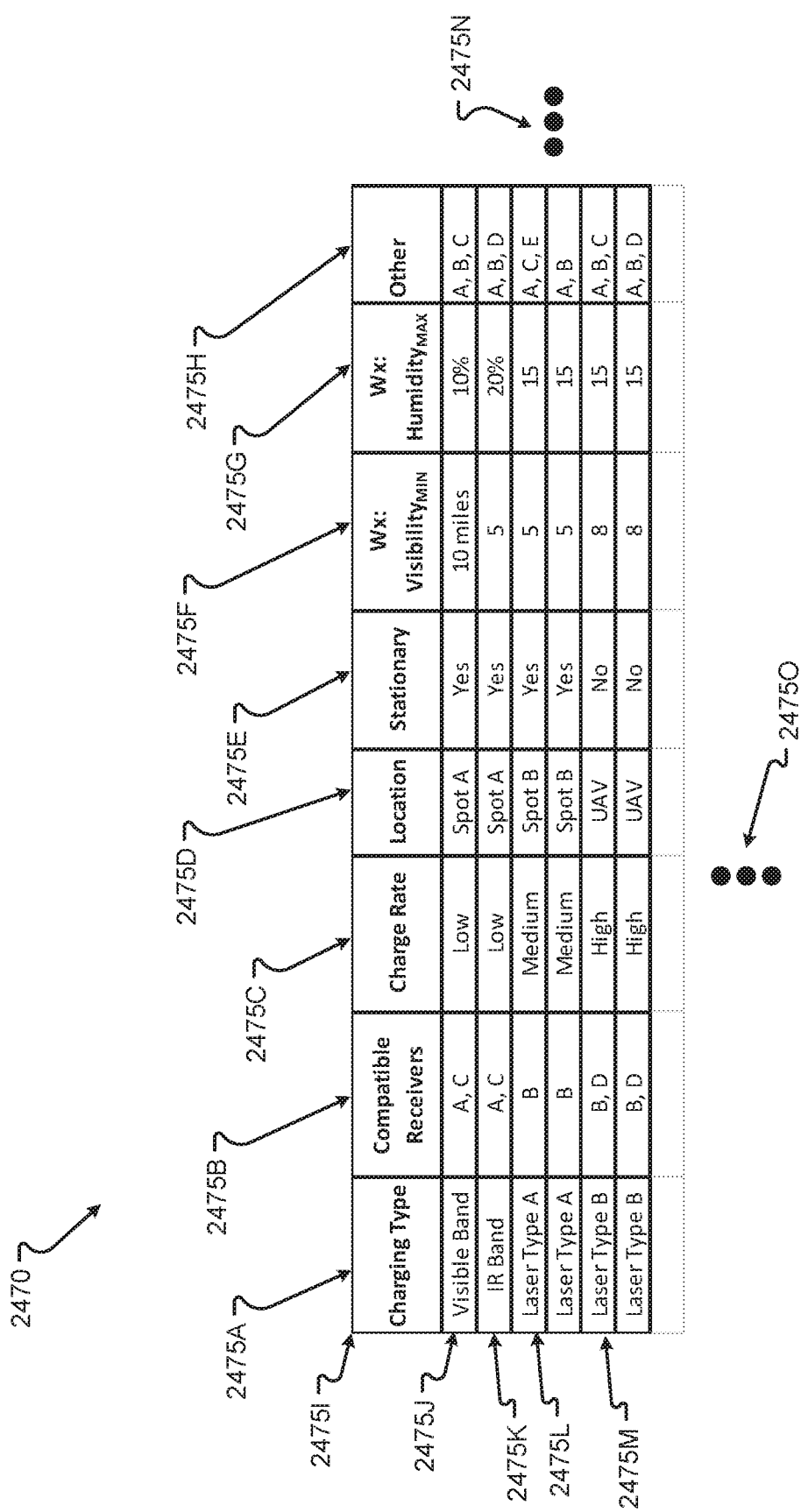
FIG. 25 is a diagram of an embodiment of a data structure for storing information about a vehicle in an optical charging environment.
Figure 26:
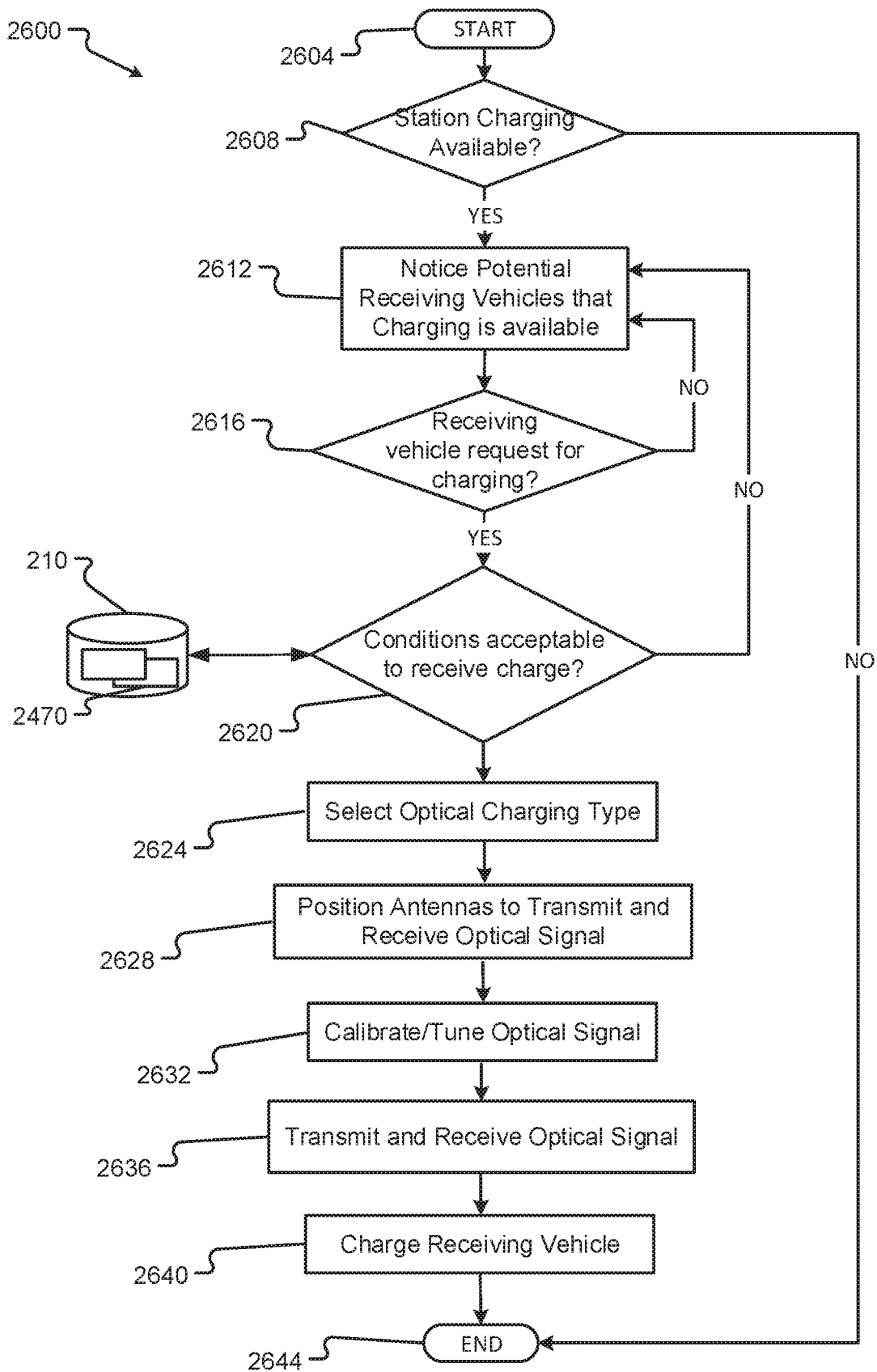
FIG. 26 is a flow or process diagram of a method of optical charging.

A system and method for optical charging of a vehicle is disclosed in FIGS. 24-26. Generally, the system enables a receiving vehicle to receive a charge by optical means from an optical charging station. Here, optical is broadly defined to include any electromagnetic spectrum means and directed energy means.

With attention to FIG. 24, one embodiment of an optical charging system 2400 is depicted. The system 2400 comprises an optical charging station 2410 and an optical charge receiving vehicle 2450.

The optical charging station 2410 comprises a power source 516, a charge provider controller 622 (which interconnects with the power source 516), an optical charging station base 2420 interconnected with optical charging station antenna controller 2422, the optical charging station antenna controller 2422 interconnected with the optical charging station antenna 2424. The optical charging station antenna 2424 emits optical charging station signal 2430, as directed or pointed by optical charging station antenna controller 2422. The emitted and directed optical charging station signal may comprise any band in the electromagnetic spectrum, to include without limitation visible band light emissions/bands, IR bands, microwave bands, millimeter wave bands, laser emissions and any optical or electromagnetic band or signal known to those skilled in the art. The optical charging station 2410 may comprise a plurality of antennas or emission sources, which may operate in concert, in sequence or in series. In one embodiment, the optical charging station 2410 broadcasts or emits or directs a first signal of a first band from a first antenna (or similar) to a receiving target (eg to the optical charge receiving vehicle 2450), processes that first signal of a first band, and then broadcasts a second signal of a second band from a second antenna (or similar) to the target. The first signal may provide general pointing, orientation and/or calibration data used in tuning (such as pointing, power level, etc) of the second signal prior to broadcast.

The optical charge receiving vehicle 2450 comprises receiving vehicle PV array 2456 (which may receive optical charging station signal 2430), receiving vehicle antenna 2454 (which may receive optical charging station signal 2430 and/or transmit or broadcast receiving vehicle signal 2460 to optical charging station 2410), receiving vehicle antenna/PV array controller 2452 (in communication with receiving vehicle PV array 2456 and/or receiving vehicle antenna 2454) in communication with receiving vehicle converter 2458 (which may convert a received signal to a signal that may charge energy storage unit 612). Charging panel controller 610 is in communication with one or more of receiving vehicle converter 2458, energy storage unit 612 and vehicle database 210 comprising vehicle optical charging data structure 2470. Charging panel controller 610 may determine tracking characteristics or parameters for receiving vehicle antenna/PV array controller 2452 to control or orient one or both of receiving vehicle PV array 2456 and receiving vehicle antenna 2454. Receiving vehicle antenna/PV array controller 2452 may comprise a feedback controller for controlling pointing/orientation of the antenna and/or PV array, as described with respect to FIG. 21.

FIG. 25 is a diagram of an embodiment of a data structure for storing information about a vehicle in an optical charging environment, such as provided in FIG. 24. The vehicle optical charging data structure 2470 are stored in vehicle database 210 and accessible by charge provider controller 610. The data contained in vehicle optical charging data structure 2470 enables, among other things, for the charge provider controller 610 to, in coordination with receiving vehicle antenna/PV array controller 2452, to position, control and/or orient the antenna 2454 and/or PV array 2456 for a given optical charging types and/or conditions.

Exemplar data may comprise charging type 2475A, such as various electromagnetic bands (i.e. visible band e.g. 2475J, IR band 2465K) or laser types (i.e. type A of 2475L and laser type B of 2465M). A compatible receiver type is identified in element 2475B (where A, B, C and D may reference a design type of antenna or PV array or other receiver that is compatible or able to interact with charging type of 2475A). Charge rate 24755C may be set to numerical values or a qualitative value (e.g. low, medium, high which may correspond to a charging transmission level).

A location 2475D identifies a location for charging, such as a stretch of roadway (e.g. "I-25 Hwy" to indicate Highway Interstate-25) or a static location for charging (e.g. "Spot A" or "Spot B" to alternative lat/long charging pad locations). The Stationary 2475E indicates options for moving or dynamic charging (where "UAV" indicates charging by way of an unmanned aerial vehicle aka a drone where one or both of drone and vehicle 2450 are in motion) identified as a "No" or a situation when vehicle 2450 is stationary (identified as a "Yes" data element. Data items 24755F and 2475G identify weather conditions to permit optical charging. That is, Wx:Visibility$_{MIN}$ 2475F provides values for weather visibility minimums required to allow a given charging type to provide charging. Wx:Humidity$_{MAX}$ 2475G similarly provides maximum wherein a particular type of optical charging may occur. Such weather minimums reflect underlying physics involved in optical communications. For example, low visibility conditions do not allow visible band light to propagate, while high atmospheric turbulence or humidity influence or reduce laser transmission efficiencies and pointing accuracies.

The Other data type of 2475H may comprise other data items involved in optical or electromagnetic wave propagation, charging such as voltage levels, current values, etc as known to those skilled in the art, and operational data such as costs of charging for a given charging type or charging provider. Further data fields 2475N and 2475O are possible.

FIG. 26 is a flow or process diagram of a method of optical charging. The method starts at step 2604 and ends at step 2644.

At step 2632, the optical station (emitted) signal 2430 is tuned and/or calibrated. That is, emission or broadcast or transmission characteristics of the signal 2430 are optimized or tuned for, among other things, atmospheric conditions between optical station and receiving vehicle, type of receiver on receiving vehicle (eg PV array or antenna), and transmission distance (to set, e.g. power level). Similarly, additionally or alternatively, the receiving vehicle may tune receiver characteristics (e.g. signal/noise ratio of receiver) so as to more effectively or optimally receive signal 2430. In some embodiments, an initial lower-power track illuminating laser is used to determine the target vehicle's range and provide initial information on the atmosphere through which the main power (second, power charging) beam is being transmitted. The illuminating laser tracks the target and provides aiming data for the later primary (power charging) beam. The second higher-power beam 2430(e.g. a higher power laser beam) may also be configured to reflect light from the target (perhaps with aid of a reflective corner or other known target reflector) as signal 2432 to provide data on the rapidly changing characteristics of the atmosphere along the path of the laser beam. In one embodiment, these data are used to control a set of deformable mirrors of the optical charging station antenna 2424, as controlled by the antenna controller 2422. The mirrors introduce tailored distortions into the laser beam to compensate for atmospheric distortions and allow the laser beam to fall on the target at the intended location (the location being the vehicle receiver, e.g. antenna 2454 and/or PV array 2456). The method 2600 continues to step 2636 wherein the optical charging station 2410 emits or transmits the signal 2430 wherein the signal 2430 is received by the vehicle 2450. The method continues to step 2640.

At step 2616 a query is made as to whether a particular receiving vehicle 2450 has requested or requires or seeks a charge. Note that controller 610 may monitor a state or status of charging (e.g. battery is charged at 32%, or battery charging level drops below a selectable threshold value e.g. below 10%) of the energy storage unit 612 of receiving vehicle 2450 to determine if charging is recommended or required. A user, such as a driver or passenger, may also request that the vehicle be charged. If NO, the method proceeds back to step 2612. If YES, the method proceeds to step 2620.

At step 2620, a query is made as to whether the receiving vehicle 2450 is configured to receive the charging from optical charging station 2410. Such a query may be facilitated by communications between vehicle "smart" control systems aboard one or both of receiving vehicle 2450 and optical charging station 2410, comprising communications between controller 610 of vehicle 2450 and controller 622 of optical station 2410. Note that incompatibilities may include min/max energy transfer thresholds (e.g. voltages) and electrical or mechanical incompatibilities (of, e.g., antenna 2454 or PV array 2456 and incoming signal 2430). If the query answer is a NO, the method proceeds to step 2612. If YES, the method proceeds to step 2624 wherein the receiving vehicle 2450 selects an optical charging type. After completing step 2628, the method 2600 proceeds to position a receiver (one or more of antenna 2454 and PV array 2456) to receive the signal 2430 (and in some embodiments, also transmit a signal 2460). The method 2600 then continues to step 2632.

At step 2632, the optical station (emitted) signal 2430 is tuned and/or calibrated. That is, emission or broadcast or transmission characteristics of the signal 2430 are optimized or tuned for, among other things, atmospheric conditions between optical station and receiving vehicle, type of receiver on receiving vehicle (eg PV array or antenna), and transmission distance (to set, e.g. power level). Similarly, additionally or alternatively, the receiving vehicle may tune receiver characteristics (e.g. signal/noise ratio of receiver) so as to more effectively or optimally receive signal 2430. In some embodiments, an initial lower-power track illuminating laser is used to determine the target vehicle's range and provide initial information on the atmosphere through which the main power (second, power charging) beam is being transmitted. The illuminating laser tracks the target and provides aiming data for the later primary (power charging) beam. The second higher-power beam (e.g. a higher power laser beam) may also be configured to reflect light from the target (perhaps with aid of a reflective corner or other known target reflector) to provide data on the rapidly changing characteristics of the atmosphere along the path of the laser beam. In one embodiment, these data are used to control a set of deformable mirrors of the optical charging station antenna 2424, as controlled by the antenna controller 2422. The mirrors introduce tailored distortions into the laser beam to compensate for atmospheric distortions and allow the laser beam to fall on the target at the intended location (the location being the vehicle receiver, e.g. antenna 2454 and/or PV array 2456). The method 2600 continues to step 2636 wherein the optical charging station 2410 emits or transmits the signal 2430 wherein the signal 2430 is received by the vehicle 2450. The method continues to step 2640.

At step 2640, the vehicle 2450 is charged. More specifically, vehicle receiver, such as antenna 2454 and/or PV array 2456, receives signal 2430, and processes the signal prior to providing to converter 2458. the converter 2458 provides any conversion required to the received signal from the vehicle receiver so as to provide an electrical charge to the energy storage unit 612. The method 2600 ends at step 2644.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A system for vehicle optical charging, the system comprising:
    an optical charging station that transmits an optical signal, the optical charging station comprising a directive element that directs the transmitted optical signal; and
    a receiver that receives the transmitted optical signal, the receiver being in electrical communication with an electrical storage unit of a vehicle and being tunable in accordance with the received optical signal,
    wherein the received optical signal enables charging of the electrical storage unit,
    wherein the optical charging station transmits another optical signal to gather initial information on an atmosphere through which the optical signal travels and to gather aiming data for the optical signal,
    wherein the another optical signal is at lower-power than the optical signal, and
    wherein the optical charging station receives a reflected version of the optical signal to produce additional information on rapidly changing characteristics of the atmosphere.

2. The system of claim 1, wherein the receiver is interconnected to the vehicle and configured to operate in a plurality of states comprising a retracted state and a deployed state.

3. The system of claim 2, further comprising an actuator interconnected to the receiver and to the vehicle, wherein the actuator is configured to orient the receiver to receive the transmitted optical signal.

4. The system of claim 1, wherein the receiver is one of an antenna and a PV array.

5. The system of claim 4, wherein the vehicle is an electrically-powered vehicle.

6. The system of claim 5, further comprising a controller that determines if the vehicle requires charging.

7. The system of claim 1, wherein the directive element comprises a station antenna.

8. The system of claim 7, wherein the optical charging station further comprises a station controller configured to track a position of the receiver of the vehicle.

9. The system of claim 8, wherein the station controller directs the station antenna to the tracked position of the receiver of the vehicle.

10. The system of claim 9, wherein the transmitted optical signal is a laser signal.

11. The system of claim 10, wherein charging is performed while the vehicle is in motion.

12. The system of claim 3, wherein the optical charging station further comprises deformable mirrors configured to introduce tailored distortions into the optical signal to compensate for atmospheric distortions determined from the information.

13. A method for vehicle optical charging, the method comprising:
   determining, by a microprocessor, if an optical charging station is available for charging of a receiving vehicle;
   requesting, by the microprocessor, transmission of an optical signal from the optical charging station to a receiver of the receiving vehicle;
   orienting, by the microprocessor, the receiver to receive the optical signal;
   receiving, by the receiver, the optical signal from the optical charging station, the receiver being in electrical communication with a receiving vehicle electrical storage unit;
   receiving, by the receiver, another optical signal, the another optical signal providing initial information to the optical charging station on an atmosphere through which the optical signal travels and providing aiming data to the optical charging station for the optical signal, the another optical signal being transmitted and received at lower power than the optical signal;
   reflecting, by the receiving, the optical signal such that the optical charging station produces additional information on rapidly changing characteristics of the atmosphere, and
   changing at least one characteristic of the receiver in accordance with at least one of the optical signal and the another optical signal,
   wherein the optical signal enables charging of the receiving vehicle electrical storage unit.

14. The method of claim 13, further comprising selecting, by the microprocessor, a type of optical signal.

15. The method of claim 14, further comprising operating an actuator interconnected to the receiver and to the receiving vehicle to orient the receiver to receive the optical signal.

16. The method of claim 15, wherein the receiver is one of an antenna and a PV array.

17. The method of claim 15, wherein the receiving vehicle is an electrically-powered vehicle.

18. The method of claim 17, further comprising tracking a position of the receiver.

19. The method of claim 18, further comprising directing a station antenna to the tracked position of the receiver.

20. The method of claim 19, wherein the optical signal is a laser signal, wherein charging is performed while the receiving vehicle is in motion, and wherein the actuator is further configured to orient the receiver in at least a pitch and a yaw rotational position.

* * * * *